(12) United States Patent
Kapinski et al.

(10) Patent No.: US 9,306,444 B2
(45) Date of Patent: Apr. 5, 2016

(54) HARMONIC NEUTRALIZED FREQUENCY CHANGER (HFNC) CONTROL SYSTEM AND A HFNC INCLUDING THE SAME

(71) Applicants: James P. Kapinski, Redondo Beach, CA (US); David J. Hall, Pittsburgh, PA (US)

(72) Inventors: James P. Kapinski, Redondo Beach, CA (US); David J. Hall, Pittsburgh, PA (US)

(73) Assignee: Curtiss-Wright Electro-Mechanical Corporation, Cheswick, PA (US)

( * ) Notice: Subject to any disclaimer, the term of this patent is extended or adjusted under 35 U.S.C. 154(b) by 157 days.

(21) Appl. No.: 14/132,238

(22) Filed: Dec. 18, 2013

(65) Prior Publication Data
US 2015/0171735 A1  Jun. 18, 2015

(51) Int. Cl.
*H02M 1/12* (2006.01)
*H02M 5/27* (2006.01)

(52) U.S. Cl.
CPC . *H02M 1/12* (2013.01); *H02M 5/27* (2013.01)

(58) Field of Classification Search
CPC ....... H02M 1/12; H02M 5/22; H02M 5/2576; H02M 5/273; H02M 5/293; H02M 5/297; H02M 2005/2932

USPC ............................................. 363/39, 78, 159
See application file for complete search history.

(56) References Cited

U.S. PATENT DOCUMENTS

| 6,882,550 | B1* | 4/2005 | Baumgart | H02M 5/271 323/207 |
| 7,388,766 | B2* | 6/2008 | Baumgart | H02M 1/12 323/207 |
| 2015/0171735 | A1* | 6/2015 | Kapinski | H02M 5/27 363/40 |

* cited by examiner

*Primary Examiner* — Jeffrey Sterrett
(74) *Attorney, Agent, or Firm* — Reed Smith LLP

(57) ABSTRACT

A control system for a harmonic neutralized frequency changer. The control system includes a processor, a narrow band harmonic controller and a fundamental current controller. The narrow band harmonic controller is communicably connected to the processor and is configured to reduce a positive sequence component, a negative sequence component and a zero sequence component of a harmonic generated by a cycloconverter of the harmonic neutralized frequency changer. The fundamental current controller is communicably connected to the processor and is configured to reduce a fundamental frequency component of current flowing in a neutralization inverter of the harmonic neutralized frequency changer.

20 Claims, 20 Drawing Sheets

HARMONIC NEUTRALIZED FREQUENCY CHANGER (HFNC) CONTROL SYSTEM AND A HFNC INCLUDING THE SAME

STATEMENT REGARDING FEDERALLY SPONSORED RESEARCH

This invention was made with United States Government support in the form of Contract Nos. N00014-09-C-0713 and N00014-11-C-0180 with the Office of Naval Research. The United States Government may have certain rights in the invention.

BACKGROUND

This application discloses an invention which is related, generally and in various embodiments, to a harmonic neutralized frequency changer (HFNC) control system and a HFNC including the same.

A Harmonic Neutralized Frequency Changer (HNFC) is a power converter system that produces variable frequency multiphase AC power from fixed or variable frequency AC power. Exemplary embodiments of an HNFC are described in U.S. Pat. No. 6,882,550 (the '550 patent), the contents of which are herein incorporated by reference in their entirety. Exemplary embodiments of a control system for an HNFC are described in U.S. Pat. No. 7,388,766 (the '766 patent), the contents of which are herein incorporated by reference in their entirety.

FIG. 1 illustrates a prior art HNFC, which is similar to the HNFC shown in FIG. 1 of the '766 patent. The prior art HNFC of FIG. 1 achieves a direct ac-to-ac power conversion using a cycloconverter (frequency change power converter). The unwanted harmonics from the cycloconverter are actively neutralized using high bandwidth PWM inverters (neutralization inverters). The prior art HNFC of FIG. 1 shows harmonic neutralization at both the input and output of the cyclocon-verter using series voltage injection with harmonic injection transformers. It will be appreciated that harmonic neutralization is also possible using shunt current injection as described, for example, at column 7, lines 14-45 of the '766 patent.

FIG. 2 illustrates a prior art HNFC control system for narrow band harmonic neutralization using series voltage injection at the output of the cycloconverter. The prior art HNFC control system of FIG. 2 is similar to the HFNC control system shown in FIG. 4 of the '766 patent. In the prior art HNFC control system of FIG. 2, the output voltage ($V_o$) is measured and fed back to multiple narrow band harmonic controllers. The narrow band harmonic controllers use harmonic numbers to select specific harmonic frequencies for neutralization. Each narrow band harmonic controller produces a set of inverter reference voltages (one for each electrical phase). The reference voltages from each narrow band harmonic controller are summed by phase to form a single set of three phase neutralization inverter reference voltages. The PWM inverter and its controller take the reference voltage signals and produce power voltages (neutralization waveforms) that actively cancel the harmonics in the output voltage waveform of the cycloconverter. The neutralization waveforms are added in series to the output voltage of the cycloconverter using a harmonic injection transformer. FIG. 2 shows a three-phase system for simplicity. Systems with multiple three-phase sets of output voltages are also covered in the '766 patent. In addition, the '766 patent also describes wide-band harmonic neutralization controllers using series voltage injection.

FIG. 3 illustrates a more detailed representation of the narrow band harmonic controllers of the prior art HNFC control system of FIG. 2. The detailed representation of the narrow band harmonic controllers shown in FIG. 3 is similar to the HFNC control system shown in FIG. 4 of the '766 patent. The measured output voltages ($V_{AO}$, $V_{BO}$, $V_{CO}$) are converted from time domain to the rotating direct and quadrature axis reference frame using the equations in the bottom left corner of FIG. 3. The harmonic number h is multiplied by the reference angle $\alpha$ and used in the reference frame transformation to select the specific harmonic frequency targeted for neutralization. The harmonic reference voltages in the d-q reference frame are set to zero to eliminate the harmonic. Although equation 2, at column 4, lines 55-56 of the '766 patent may be read as implying that both positive and negative sequence harmonic components are possible (e.g., the positive sequence harmonic components "rotate" with the same sequence as the fundamental and the negative sequence harmonic components "rotate" in the opposite sequence as the fundamental), the '766 does not specifically describe the need to neutralize harmonic components of a given sequence (positive or negative). The voltage error signals in the d and q axes are operated on by proportional plus integral (P+I) controllers as shown to generate inverter reference voltages ($V_{qi}^*$, $V_{di}^*$) in the rotating reference frame. The inverter reference voltages are transformed back to the time domain using the equations in the bottom right corner of FIG. 3. The 3-phase inverter reference voltages ($V_{Ah}^*$, $V_{Bh}^*$, $V_{Ch}^*$) for each narrow band harmonic controller are sent to the summer shown in FIG. 2 and then on to the PWM inverter and its controller.

FIG. 4 illustrates a prior art HNFC control system for narrow band harmonic neutralization via shunt current injection at the output of the cycloconverter. The prior art HNFC control system of FIG. 4 is similar to the HFNC control system shown in FIG. 3 of the '766 patent. The output current ($I_o$) is measured and fed back to multiple narrow band harmonic controllers. The narrow band harmonic controllers use harmonic numbers to select specific harmonic frequencies for neutralization. Each narrow band harmonic controller produces a set of inverter reference voltages (one for each electrical phase). The reference voltages from each narrow band harmonic controller are summed by phase to form a single set of three phase neutralization inverter reference voltages. The PWM inverter and its controller take the reference voltage signals and produce power voltages. The power voltages interact with a tie impedance to generate currents that actively cancel the harmonics in the output current waveform of the cycloconverter. The neutralization current waveforms are added directly in parallel to the output currents. FIG. 4 shows a three-phase system for simplicity. Systems with multiple three-phase sets of output voltages are also covered in the '766 patent. In addition, the '766 patent also describes wide-band harmonic neutralization controllers using shunt current injection.

FIG. 5 illustrates a more detailed representation of the narrow band harmonic controllers of the prior art HNFC control system of FIG. 4. The more detailed representation of the narrow band harmonic controllers shown in FIG. 5 is similar to the HFNC control system shown in FIG. 3 of the '766 patent. The operation of the current injection narrow band harmonic controller of FIG. 5 is similar to the voltage injection narrow band harmonic controller of FIG. 3. The measured output currents ($I_A$, $I_B$, $I_C$) are converted from time domain to the rotating direct and quadrature axis reference frame using the equations in the bottom left corner of FIG. 5. The harmonic number h is multiplied by the reference angle $\alpha$ and used in the reference frame transformation to select the specific harmonic frequency targeted for neutralization. The harmonic reference currents in the d-q reference frame are set to zero to eliminate the harmonic. The voltage error signals in the d and q axes are operated on by proportional plus integral controllers as shown to generate inverter reference voltages ($V_{qh}^*$, $V_{dh}$) in the rotating reference frame. The inverter reference voltages are transformed back to the time domain using the equations in the bottom right corner of FIG. 5. The 3-phase inverter reference voltages ($V_{Ah}^*$, $V_{Bh}^*$, $V_{Ch}^*$) for each narrow band controller are sent to the summer shown in FIG. 4 and then on to the PWM inverter and its controller.

BRIEF DESCRIPTION OF THE DRAWINGS

Various embodiments of the invention are described herein in by way of example in conjunction with the following figures, wherein like reference characters designate the same or similar elements.

DETAILED DESCRIPTION

It is to be understood that at least some of the figures and descriptions of the invention have been simplified to illustrate elements that are relevant for a clear understanding of the invention, while eliminating, for purposes of clarity, other elements that those of ordinary skill in the art will appreciate may also comprise a portion of the invention. However, because such elements are well known in the art, and because they do not facilitate a better understanding of the invention, a description of such elements is not provided herein.

As described in more detail hereinbelow, aspects of the invention may be implemented by a computing device and/or a computer program stored on a computer-readable medium. The computer-readable medium may comprise a disk, a device, and/or a propagated signal.

Figure 6:
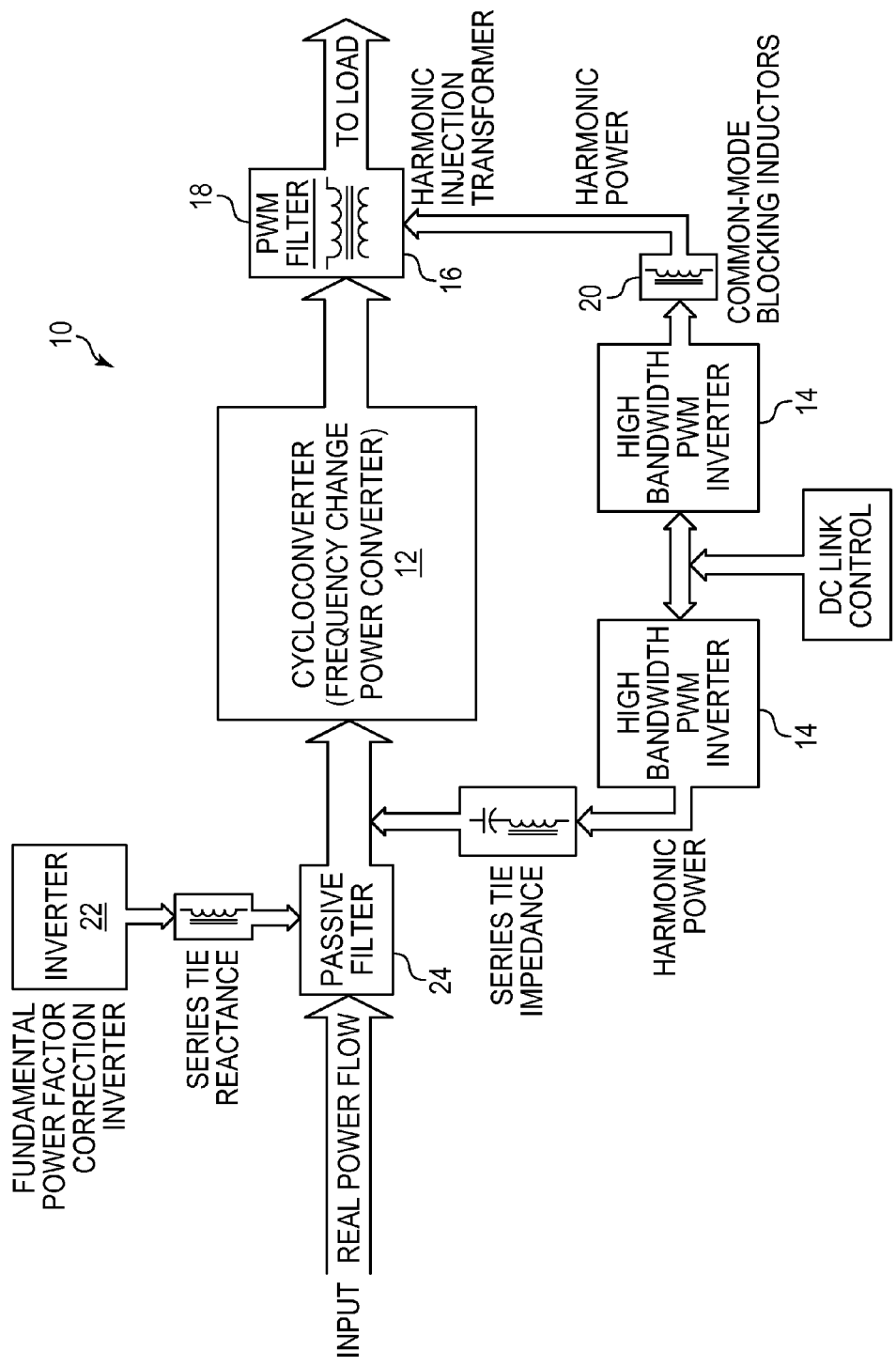
FIG. 6 illustrates various embodiments of a HNFC.

FIG. 6 illustrates various embodiments a HNFC 10. The HFNC 10 may be utilized for any suitable purpose. For example, the HFNC 10 may be utilized to provide direct conversion of incoming ac power to variable ac output power to control the speed of a ship's propeller. The HFNC 10 includes a cycloconverter 12, PWM inverters 14 (neutralization inverters), a harmonic injection transformer 16, a PWM filter 18 (e.g., low pass filter) and a control system. The control system is not shown in FIG. 6 for purposes of clarity and will be described in more detail hereinbelow. According to various embodiments, the HNFC 10 also includes a common-mode blocking inductor 20, a fundamental power factor correction inverter 22 and a passive filter 24.

For the HNFC 10, the unwanted harmonics from the cycloconverter 12 are actively neutralized using fractionally-rated neutralization inverters 14 which generate neutralizing waveforms which are injected (series voltage injection) at the harmonic injection transformer 16 to neutralize the output harmonics of the cycloconverter 12. In contrast to the prior art HNFC of the '766 patent, the output inverter PWM filter 18 is on the load side of the harmonic injection transformer 16. The PWM 18 filter may be embodied as a low pass filter which operates to scrape off high frequency noise produced by the neutralization inverter 14. According to various embodiments, at least part of the harmonic injection transformer 16 may be utilized as part of the PWM filter 18. In addition, common-mode blocking inductors 20, which are not disclosed in the '766 patent, have been added to the output harmonic neutralization circuit. A single phase common-mode inductor 20 may be placed on the output of each neutralization inverter 14 phase to improve performance by preventing common-mode oscillations from reaching the load. Since the common-mode inductors 20 are single phase they do not prevent the neutralization inverter 14 from sending 3-Phase zero sequence voltages to the load to neutralize zero sequence harmonic components in the load (the zero sequence harmonic components do not "rotate"—they are in phase with each other).

Figure 4:
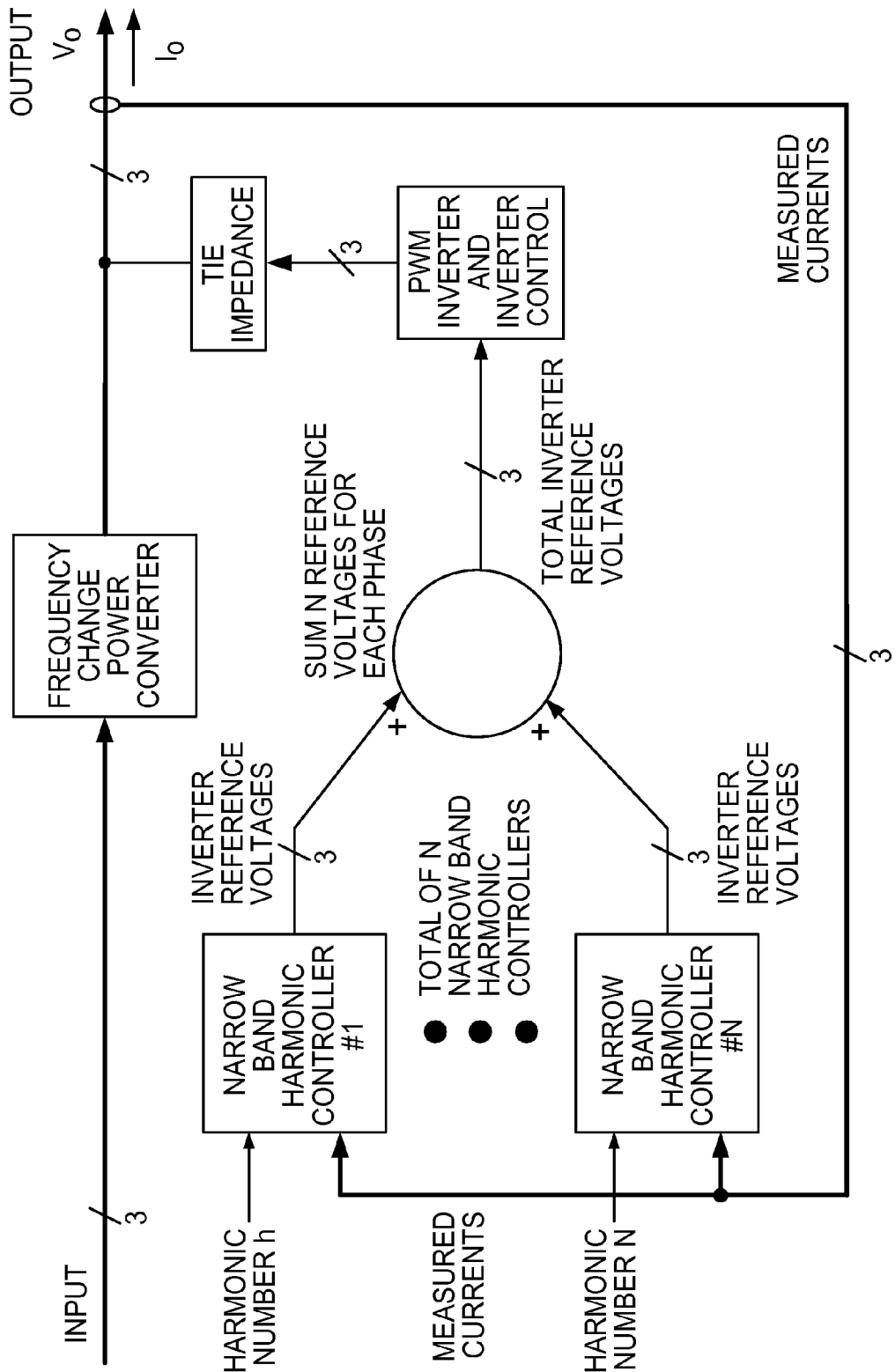
FIG. 4 illustrates a prior art HNFC control system.
Figure 5:
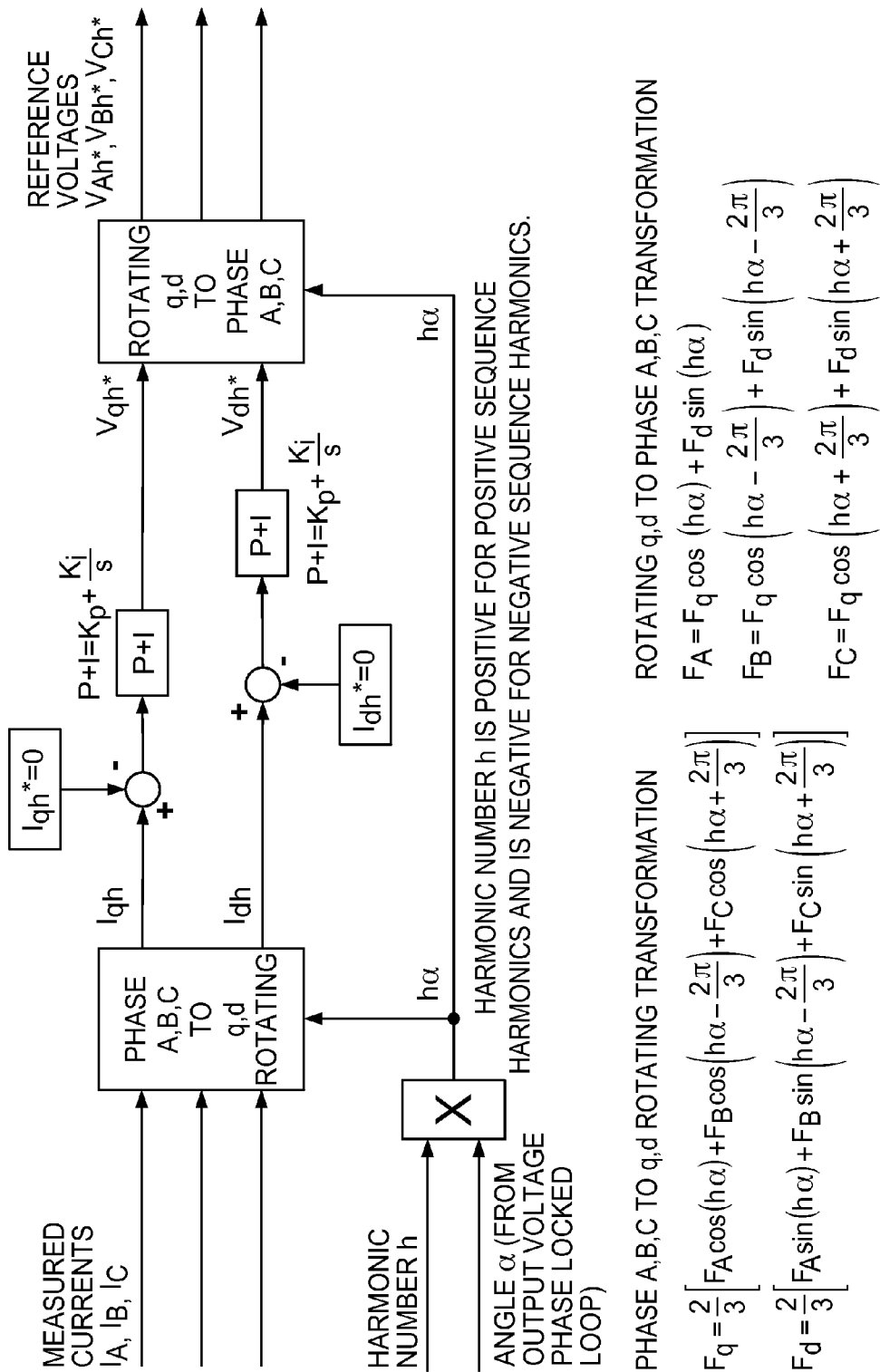
FIG. 5 illustrates a more detailed representation of a narrow band harmonic controller of the prior art HNFC control system of FIG. 4.

The input harmonics are neutralized using shunt current injection as described in the '766 patent and as shown in FIG. 4. The fundamental power factor correction inverter 22, which is not disclosed in the '766 patent, is on the input side of the cycloconverter 12 and provides the significant reactive power required at the cycloconverter 12 input. This fractionally-rated fundamental power factor correction inverter 22 allows the HNFC 10 to be connected to sources that cannot provide a large amount of reactive power or operate at a low power factor. According to various embodiments, the fundamental power factor correction inverter 22 is a line frequency switched inverter and uses a control system based on reactive power measurement. In further contrast to the HNFC of the '766 patent, the passive filter 24 for the input neutralization inverter 14 is at the incoming power mains to allow the passive filter 24 to also reduce such harmonics from the fundamental power factor correction inverter 22. The above-described improvements to the configuration operate to enhance the performance of the HNFC 10 over the prior art HNFCs by reducing the reactive power that the source must provide to cycloconverter 12 input.

Figure 7:
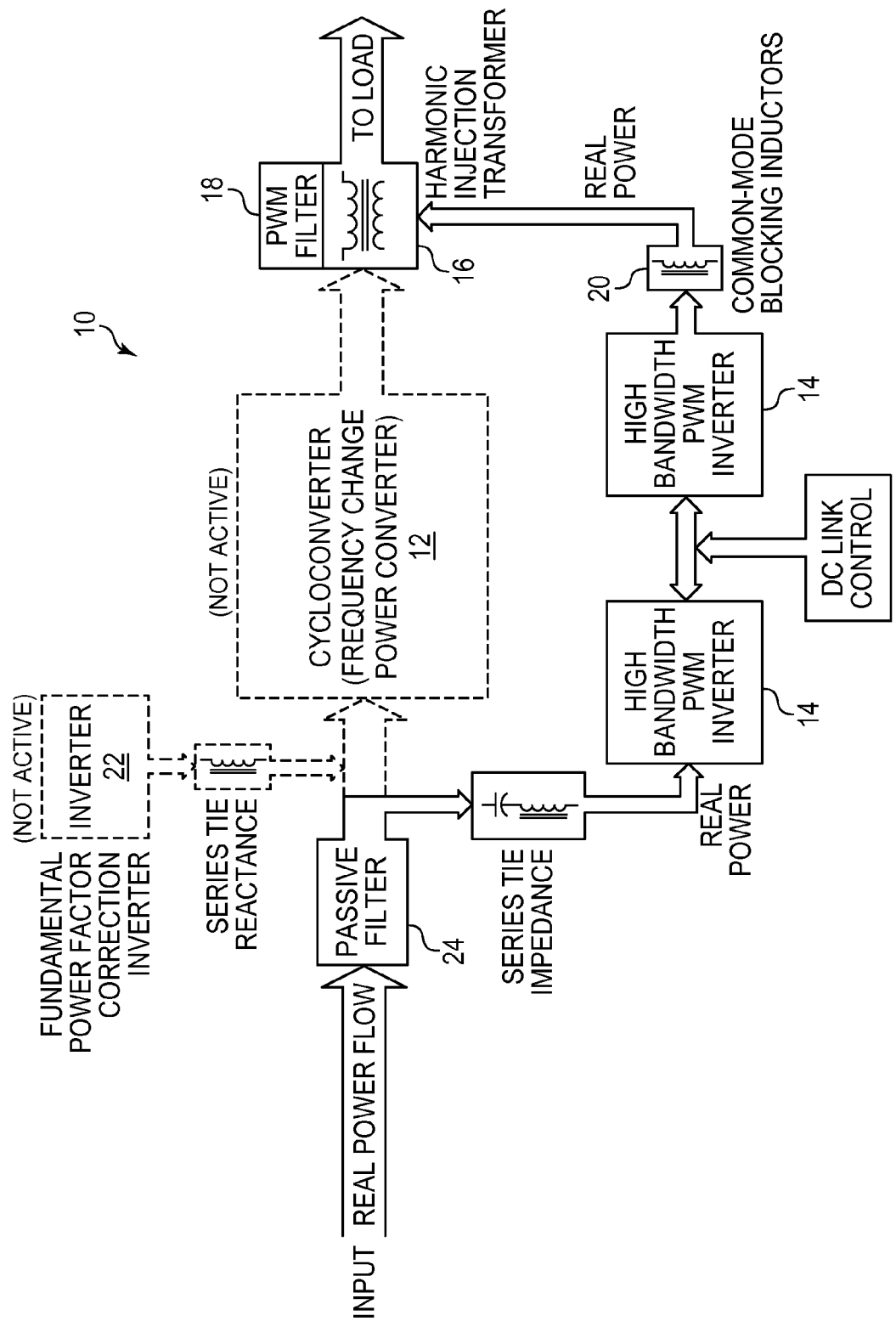
FIG. 7 illustrates operation of the HNFC of FIG. 6 in a bypass mode according to various embodiments.

In addition, the above-described configuration of the HNFC 10 allows low power operation of the system with the cycloconverter 12 bypassed as shown in FIG. 7. In this configuration, the real power flows from the input, through the two neutralization inverters 14, to the load and the cycloconverter 12 is inactive. The fundamental power factor correction inverter 22 is also inactive in this mode of operation. The cycloconverter 12 is also inactive and can be configured to provide an output short circuit so that power can flow in the load circuit. This can be accomplished by gating the cycloconverter 12 switches to provide a single phase short circuit at the output of each cycloconverter 12 three-phase bridge. The reduced power mode provides an efficient means of transferring small amounts of real power to the load without the need to neutralize the harmonics produced by the cycloconverter 12.

Figure 1:
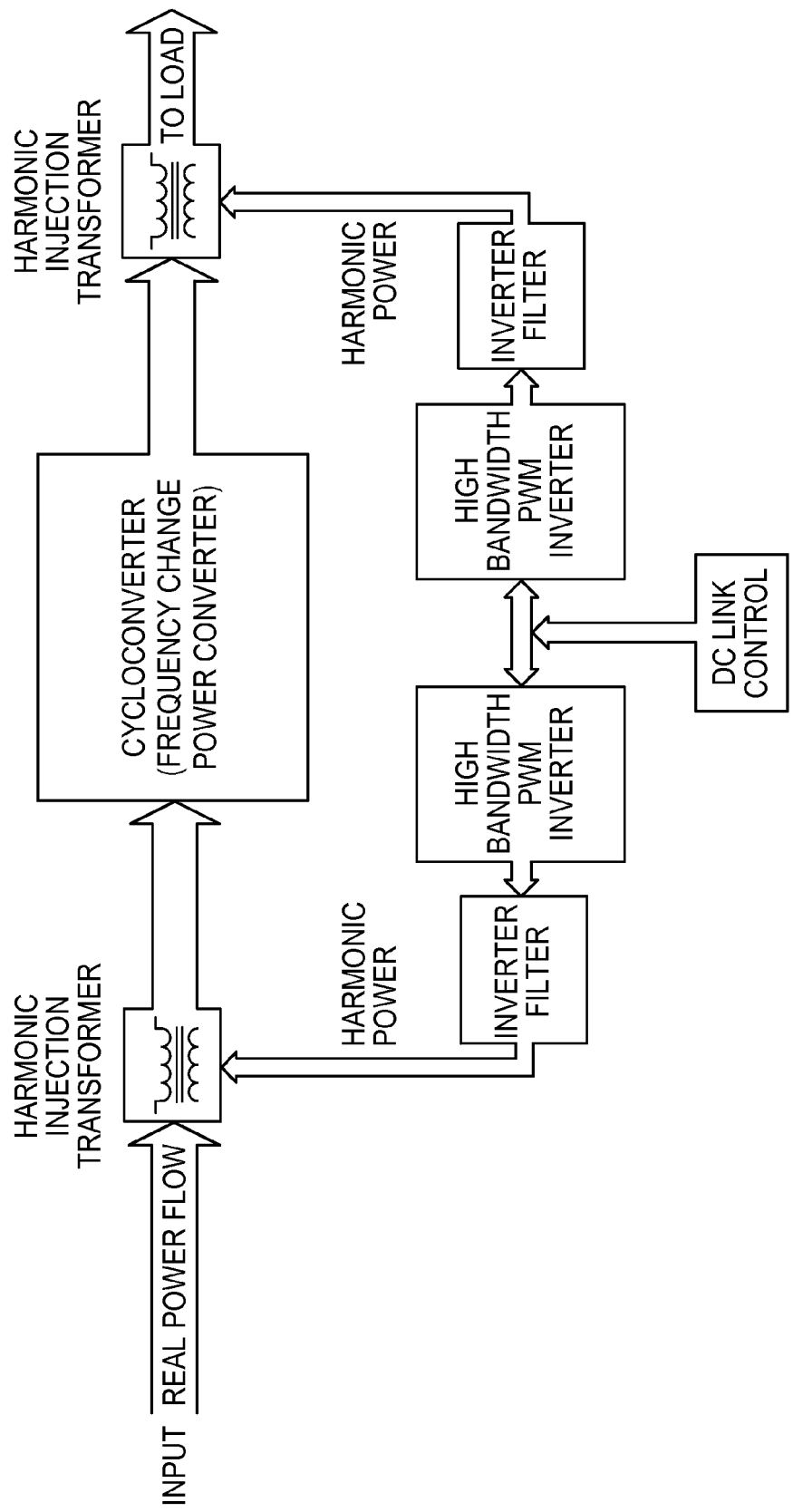
FIG. 1 illustrates a prior art HNFC.
Figure 2:
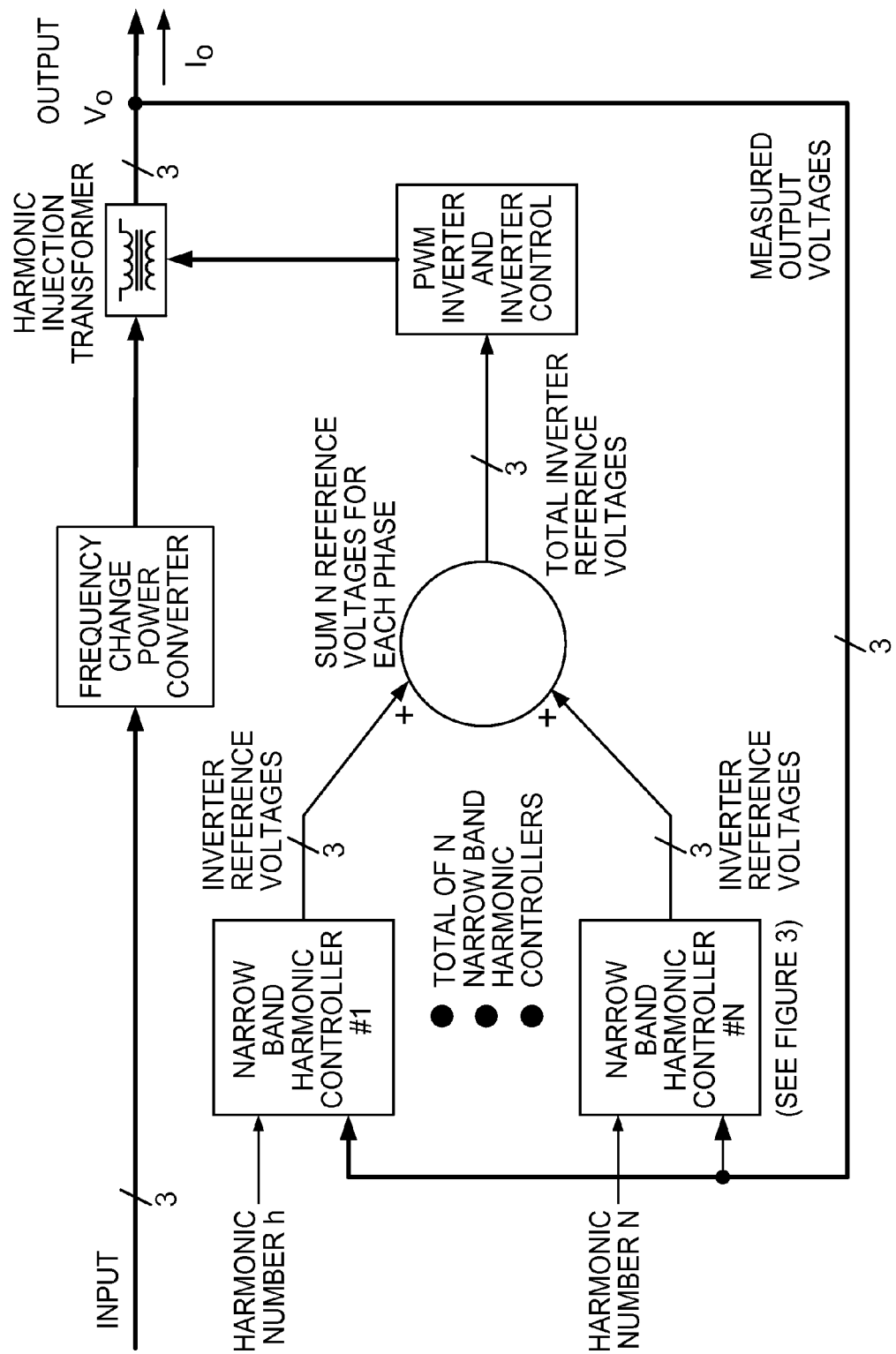
FIG. 2 illustrates a prior art HNFC control system.
Figure 3:
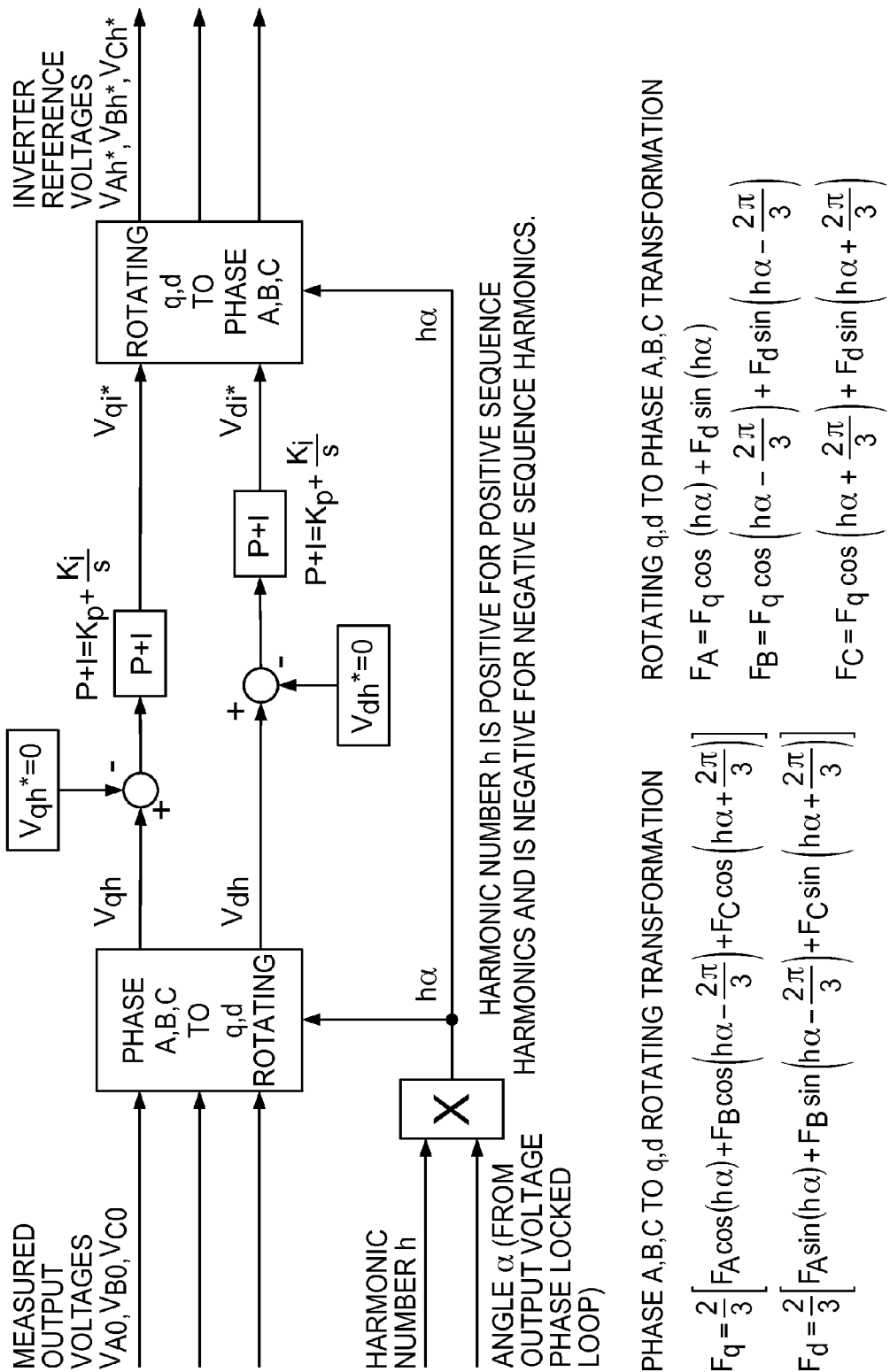
FIG. 3 illustrates a more detailed representation of a narrow band harmonic controller of the prior art HNFC control system of FIG. 2.
Figure 8:
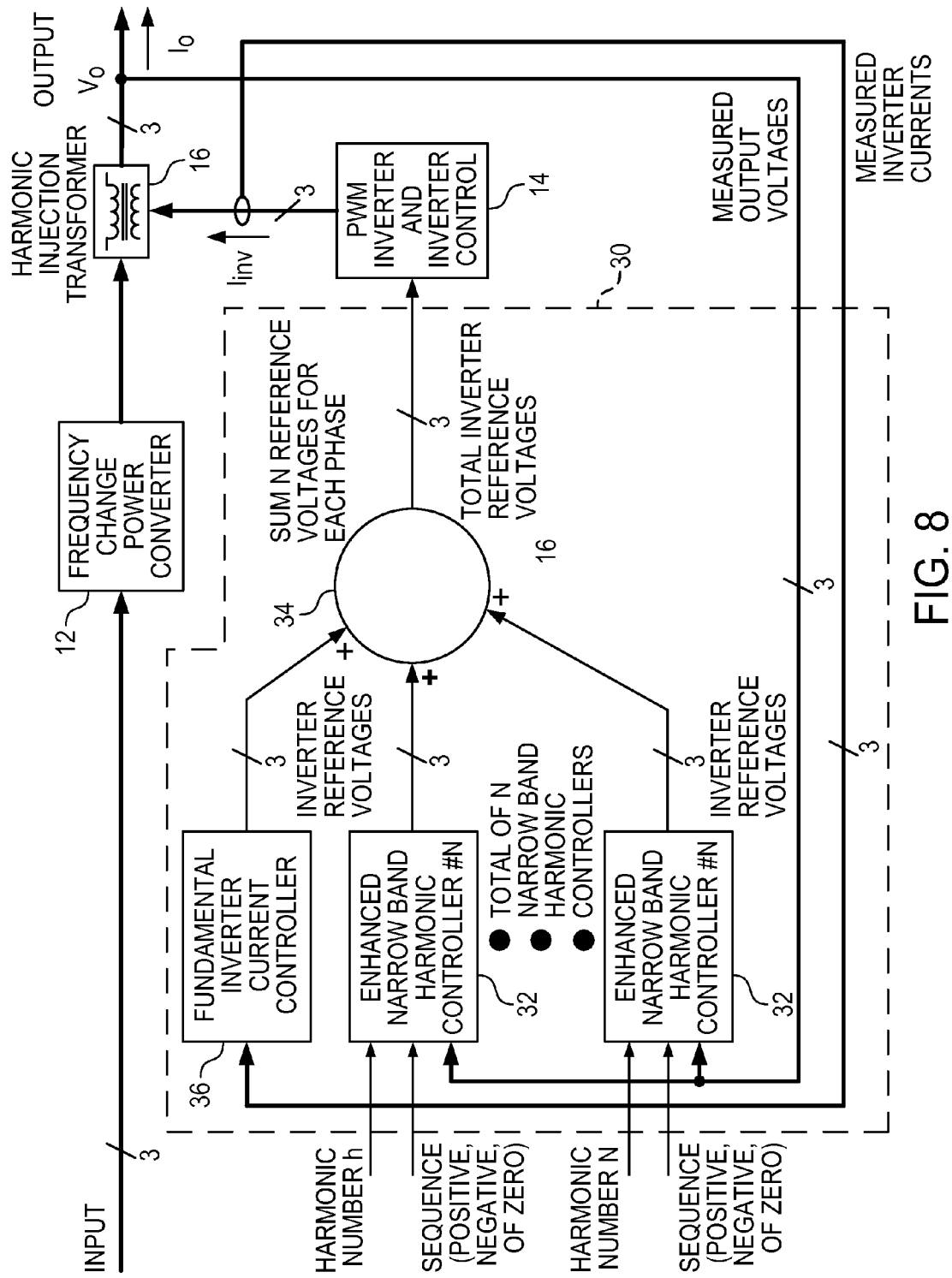
FIG. 8 illustrates various embodiments of a control system for the HFNC of FIG. 6.

FIG. 8 illustrates various embodiments of a control system 30 for the HFNC 10 of FIG. 6. The control system 30 provides for narrow band harmonic neutralization via series voltage injection at the output of the cycloconverter 12. The control system 30 includes narrow band harmonic controllers 32 and a summer 34. The control system 30 may include any number of narrow band harmonic controllers 32, and each narrow band harmonic controller 32 can be configured for a specific frequency and a specific sequence (positive, negative, zero harmonic components). Thus, if for example a total of seven harmonics are to be reduced for positive, negative and zero sequences, it will be appreciated that the control system 30 may include twenty-one narrow band harmonic controllers 32. As described in more detail hereinbelow, the narrow band harmonic controllers 32 are different than the prior art narrow band controllers of FIG. 2 (representative of FIG. 4 of the '766 patent). The control system 30 also includes a fundamental inverter current controller 36 which is not disclosed in the '766 patent.

In operation, the load voltages ($V_o$) are measured and sent to the narrow band harmonic controllers 32. Each narrow band harmonic controller 32 is also fed a unique combination of the harmonic number (the ratio of the harmonic frequency to the fundamental frequency) of the frequency to be reduced and the sequence (positive, negative, zero harmonic component) of the harmonic to be reduced. This "set up" information (the unique combination of the targeted harmonic and sequence) is unique to each narrow band harmonic controller 32 and can be provided in advance to each narrow band harmonic controller 32. For a given narrow band harmonic controller 32, the "set up" information allows the given narrow band harmonic controller 32 to select the harmonic frequency and sequence to be targeted by the given narrow band harmonic controller 32 while filtering out all the others that are present (including the fundamental). In addition, the neutralization inverter 14 current ($I_{inv}$) is measured and fed back to the fundamental inverter current controller 36. The fundamental inverter current controller 36 operates to prevent fundamental frequency current flowing in the neutralization inverter 14 by driving that current to zero. Eliminating the fundamental current allows for reducing the rating, size, and weight of the neutralization inverter 14 and the harmonic injection transformer 16. The fundamental inverter current controller 36 generates inverter reference voltages that are summed by the summer 34 with the reference voltages from the narrow band harmonic controllers 32, and the summed reference voltages are then passed to the neutralization inverter 14 and its controller. The summed reference voltages represent what the neutralization inverter 14 should output. For purposes of simplicity, the PWM filter 18 is not shown in FIG. 8.

Figure 9:
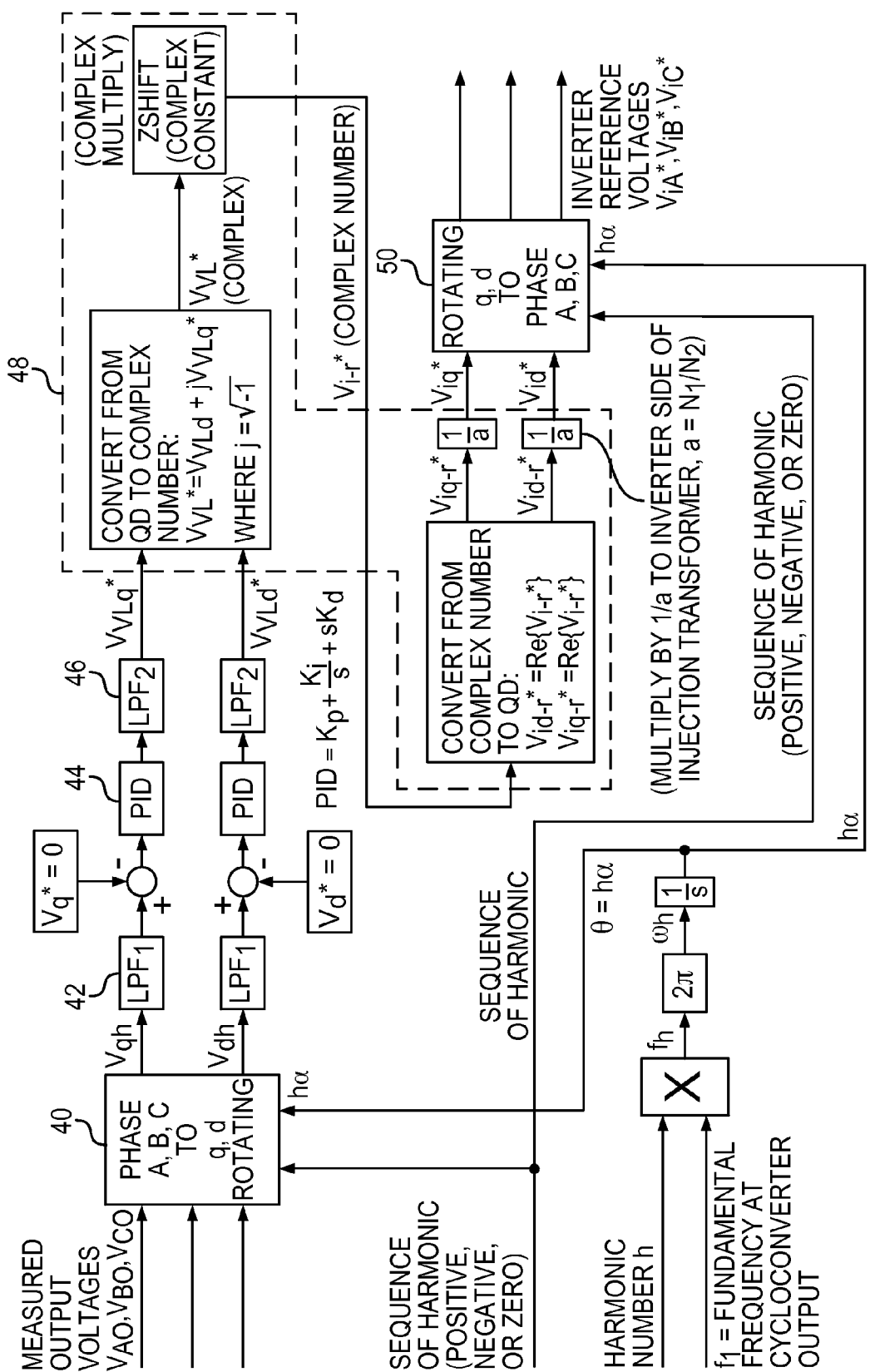
FIG. 9 illustrates various embodiments of a narrow band harmonic controller of the control system of FIG. 8.

FIG. 9 illustrates various embodiments of the narrow band harmonic controller 32 of FIG. 8. The narrow band harmonic controllers 32 target positive, negative, and zero sequence harmonics, and include a transformation module 40, low pass filters 42, proportional-integral-derivative (PID) controllers 44, low pass filters 46, a Z-shift subsystem 48 and an inverse transformation module 50. The narrow band harmonic controllers 32 use a novel technique to target specific harmonics. The technique leverages the concept of symmetrical components, in which a three-phase signal is characterized by three quantities: the positive sequence component, the negative sequence component, and the zero sequence component of the signal. In general, a three-phase signal contains all three components. The narrow band harmonic controllers 32 use the fact that the voltage harmonics produced by the cycloconverter 12 are primarily either positive sequence, negative sequence, or zero sequence. This means that for each harmonic targeted, only one component (i.e., positive, negative, or zero) is needed to characterize the unwanted noise component. A unique transformation is used to identify each targeted harmonic, depending on whether the harmonic is positive, negative, or zero sequence. Thus, it will be appreciated that the technique utilized by a given narrow band harmonic controller 32 (1) neutralizes positive, negative and zero sequence harmonic components, (2) only targets one of the sequences (positive, negative, zero) at a given point in time, and (3) utilizes a unique transformation which depends on the targeted sequence. Each narrow band harmonic controller 32 includes all of the transformations and inverse transformations needed for the positive, negative and zero sequences.

Voltage harmonic noise components that are positive sequence will have the following form:

$$v_a = m_h \sin(2 \cdot \pi \cdot f_h \cdot t + \varphi_h), \tag{1}$$

$$v_b = m_h \sin\left(2 \cdot \pi \cdot f_h \cdot t - \frac{2 \cdot \pi}{3} + \varphi_h\right), \tag{2}$$

$$v_c = m_h \sin\left(2 \cdot \pi \cdot f_h \cdot t + \frac{2 \cdot \pi}{3} + \varphi_h\right) \tag{3}$$

where $m_h$, $f_h$, $\varphi_h$ are the magnitude, frequency, and phase of the $h^{th}$ harmonic, respectively. We let $\omega_h = 2\pi f_h$.

To characterize the phase and magnitude of the targeted positive sequence harmonic, a transformation is made from the phase variables (A,B,C) to direct and quadrature (DQ) variables at the transformation module 40 using a transformation to a reference frame that is rotating at the same frequency as the targeted harmonic. The transformation, which is related to a Park's Transformation, is as follows:

$$\begin{bmatrix} v_q \\ v_d \end{bmatrix} = \frac{2}{3} \cdot \begin{bmatrix} \cos(2 \cdot \pi \cdot f_h \cdot t) & \cos\left(2 \cdot \pi \cdot f_h \cdot t - \frac{2 \cdot \pi}{3}\right) & \cos\left(2 \cdot \pi \cdot f_h \cdot t + \frac{2 \cdot \pi}{3}\right) \\ \sin(2 \cdot \pi \cdot f_h \cdot t) & \sin\left(2 \cdot \pi \cdot f_h \cdot t - \frac{2 \cdot \pi}{3}\right) & \sin\left(2 \cdot \pi \cdot f_h \cdot t + \frac{2 \cdot \pi}{3}\right) \end{bmatrix} \cdot \begin{bmatrix} v_a \\ v_b \\ v_c \end{bmatrix} \quad (4), (5)$$

where $v_q$ is the magnitude of the quadrature (Q) variable, and $v_d$ is the magnitude of the direct (D) variable. The effect of this transformation is to shift the $h^{th}$ harmonic to 0 Hz, meaning that the DC value of $v_q$ and $V_d$, will characterize the magnitude and phase of the $h^{th}$ harmonic. From the DQ variables, the magnitude and phase of the harmonic are then given by $$m_h = \sqrt{v_q^2 + v_d^2} \quad (6), (7)$$

$$\phi_h = \tan^{-1}\left(\frac{v_q}{v_d}\right)$$

where $\tan^{-1}$ is taken to be the four quadrant inverse tangent.

For positive sequence harmonics, a transformation is made from the direct and quadrature (DQ) variables in a reference frame that is rotating at the same frequency as the targeted harmonic to the phase variables (A,B,C) at the inverse transformation module 50 using the following transformation:

$$\begin{bmatrix} v_a \\ v_b \\ v_c \end{bmatrix} = \begin{bmatrix} \cos(2 \cdot \pi \cdot f_h \cdot t) & \sin(2 \cdot \pi \cdot f_h \cdot t) \\ \cos\left(2 \cdot \pi \cdot f_h \cdot t - \frac{2 \cdot \pi}{3}\right) & \sin\left(2 \cdot \pi \cdot f_h \cdot t - \frac{2 \cdot \pi}{3}\right) \\ \cos\left(2 \cdot \pi \cdot f_h \cdot t + \frac{2 \cdot \pi}{3}\right) & \sin\left(2 \cdot \pi \cdot f_h \cdot t + \frac{2 \cdot \pi}{3}\right) \end{bmatrix} \cdot \begin{bmatrix} v_q \\ v_d \end{bmatrix} \quad (8), (9), (10)$$

The method used to target negative sequence voltage harmonics is similar to the method used to target positive sequence harmonics. The following describes the differences in the way the negative sequence harmonics are targeted as opposed to the positive sequence harmonics. Voltage harmonic noise components that are negative sequence will have the following form:

$$v_a = m_h \sin(2 \cdot \pi \cdot f_h \cdot t + \phi_h) \quad (11), (12), (13)$$

$$v_b = m_h \sin\left(2 \cdot \pi \cdot f_h \cdot t + \frac{2 \cdot \pi}{3} + \phi_h\right)$$

$$v_c = m_h \sin\left(2 \cdot \pi \cdot f_h \cdot t - \frac{2 \cdot \pi}{3} + \phi_h\right)$$

The DQ transformation that is used is as follows:

$$\begin{bmatrix} v_q \\ v_d \end{bmatrix} = \quad (14), (15)$$

-continued $$\frac{2}{3} \cdot \begin{bmatrix} \cos(-2 \cdot \pi \cdot f_h \cdot t) & \cos\left(-2 \cdot \pi \cdot f_h \cdot t - \frac{2 \cdot \pi}{3}\right) & \cos\left(-2 \cdot \pi \cdot f_h \cdot t + \frac{2 \cdot \pi}{3}\right) \\ \sin(-2 \cdot \pi \cdot f_h \cdot t) & \sin\left(-2 \cdot \pi \cdot f_h \cdot t - \frac{2 \cdot \pi}{3}\right) & \sin\left(-2 \cdot \pi \cdot f_h \cdot t + \frac{2 \cdot \pi}{3}\right) \end{bmatrix} \cdot \begin{bmatrix} v_a \\ v_b \\ v_c \end{bmatrix}$$

For negative sequence harmonics, the transformation is made from the direct and quadrature (DQ) variables in a reference frame that is rotating at the same frequency as the targeted harmonic to the phase variables (A,B,C) at the inverse transformation module 50 using the following transformation:

$$\begin{bmatrix} v_a \\ v_b \\ v_c \end{bmatrix} = \begin{bmatrix} \cos(-2 \cdot \pi \cdot f_h \cdot t) & \sin(-2 \cdot \pi \cdot f_h \cdot t) \\ \cos\left(-2 \cdot \pi \cdot f_h \cdot t - \frac{2 \cdot \pi}{3}\right) & \sin\left(-2 \cdot \pi \cdot f_h \cdot t - \frac{2 \cdot \pi}{3}\right) \\ \cos\left(-2 \cdot \pi \cdot f_h \cdot t + \frac{2 \cdot \pi}{3}\right) & \sin\left(-2 \cdot \pi \cdot f_h \cdot t + \frac{2 \cdot \pi}{3}\right) \end{bmatrix} \cdot \begin{bmatrix} v_q \\ v_d \end{bmatrix} \quad (16), (17), (18)$$

The zero sequence noise harmonics are handled in a manner related to the positive and negative cases. The difference with the zero sequence case is that the standard DQ transformation cannot be used since it does not shift the targeted harmonic frequency to DC in the DQ variables. The following describes the differences between the method used to target the zero sequence harmonics as opposed to the positive and negative sequence harmonics.

The zero sequence harmonics have the following form:

$$V_a = m_h \sin(2 \cdot \pi f_h \cdot t + \phi_h) \quad (19)$$

$$V_b = m_h \sin(2 \cdot \pi \cdot f_h \cdot t + \phi_h) \quad (20)$$

$$V_c = m_h \sin(2 \cdot \pi \cdot f_h \cdot t + \phi_h) \quad (21)$$

The transformation used to identify the magnitude and phase of the targeted zero sequence harmonics is as follows:

$$\begin{bmatrix} v_q \\ v_d \end{bmatrix} = \quad (22), (23)$$

$$\frac{2}{3} \cdot \begin{bmatrix} \cos(2 \cdot \pi \cdot f_h \cdot t) & \cos(2 \cdot \pi \cdot f_h \cdot t) & \cos(2 \cdot \pi \cdot f_h \cdot t) \\ \sin(2 \cdot \pi \cdot f_h \cdot t) & \sin(2 \cdot \pi \cdot f_h \cdot t) & \sin(2 \cdot \pi \cdot f_h \cdot t) \end{bmatrix} \cdot \begin{bmatrix} v_a \\ v_b \\ v_c \end{bmatrix}$$

For zero sequence harmonics, we define the inverse transformation from direct and quadrature (DQ) variables back to phase variables is as follows:

$$\begin{bmatrix} v_a \\ v_b \\ v_c \end{bmatrix} = \frac{1}{2} \cdot \begin{bmatrix} \cos(2 \cdot \pi \cdot f_h \cdot t) & \sin(2 \cdot \pi \cdot f_h \cdot t) \\ \cos(2 \cdot \pi \cdot f_h \cdot t) & \sin(2 \cdot \pi \cdot f_h \cdot t) \\ \cos(2 \cdot \pi \cdot f_h \cdot t) & \sin(2 \cdot \pi \cdot f_h \cdot t) \end{bmatrix} \cdot \begin{bmatrix} v_q \\ v_d \end{bmatrix} \quad (24), (25), (26)$$

Figure 10:
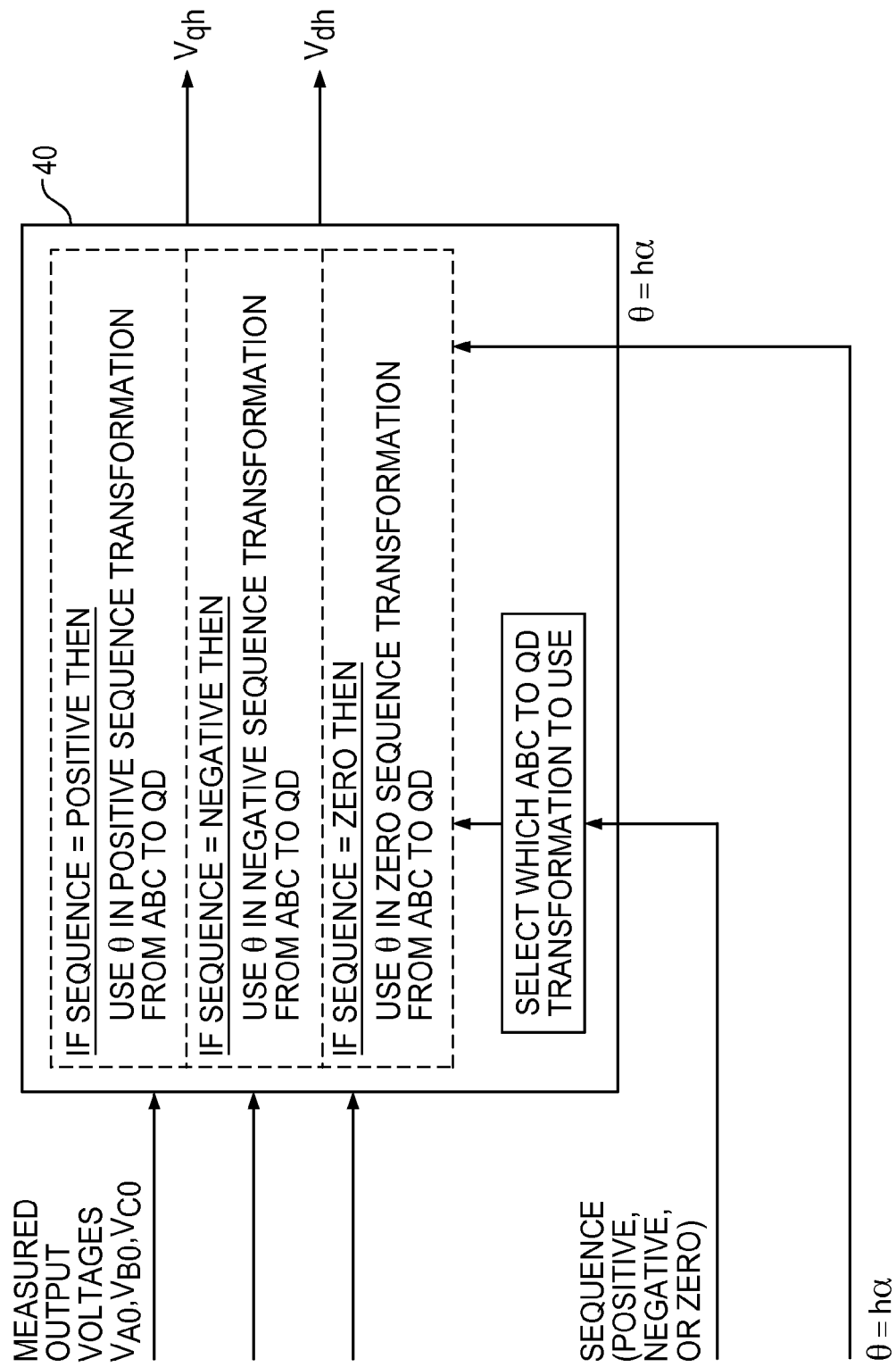
FIG. 10 illustrates various embodiments of a transformation module of the narrow band harmonic controller of FIG. 9.

FIG. 10 illustrates various embodiments of the transformation module 40 which transforms measured output voltages ($V_{AO}$, $V_{BO}$, $V_{CO}$) in the time domain to QD variables. The transformation module 40 is fed the phase voltages, the reference angle (hα) created from the product of the targeted harmonic number and the fundamental output frequency, and the sequence (positive, negative, or zero) of the targeted harmonic. The sequence of the targeted harmonic is used to select the appropriate equations for the transformation from phases A, B, and C in the time domain to QD. If the positive sequence is selected, equations (4) and (5) are used for the transformation. If negative sequence is selected, then equations (14) and (15) are used, and if zero sequence is selected, equations (22) and (23) are used.

Figure 11:
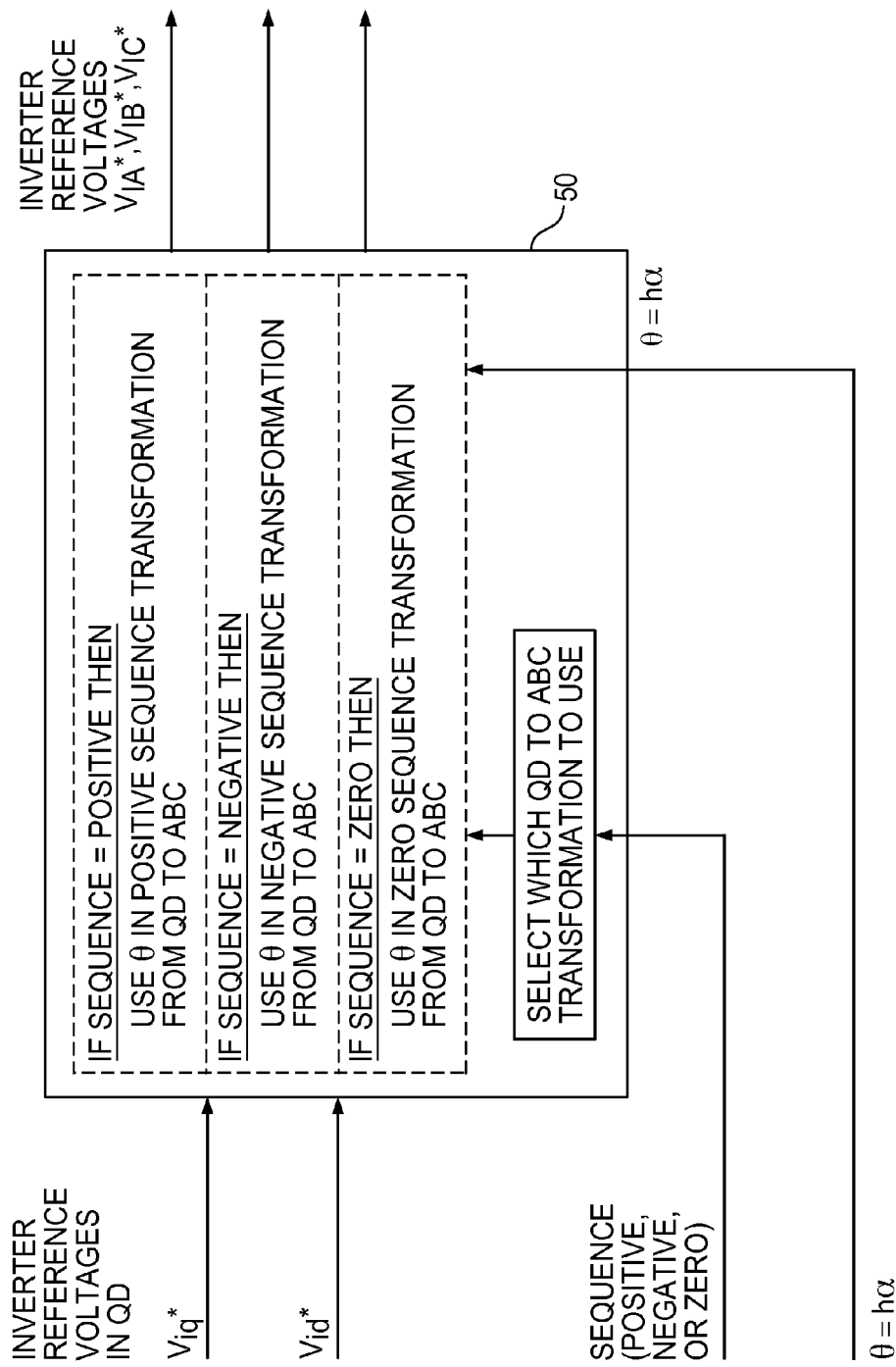
FIG. 11 illustrates various embodiments of another transformation module of the narrow band harmonic controller of FIG. 9.

FIG. 11 illustrates various embodiments of the inverse transformation module 50 which transforms the inverter reference voltages in QD ($V_{iq}^*$, $V_{id}^*$) back to inverter reference voltages ($V_{ia}^*$, $V_{ib}^*$, $V_{ic}^*$) in the time domain. The inverse transformation module 50 is fed the QD inverter reference voltages, the reference angle created from the product of the targeted harmonic number and the fundamental output frequency, and the sequence (positive, negative, or zero) of the targeted harmonic. The sequence of the targeted harmonic is used to select the appropriate equations for the transformation from the QD reference frame back to phases A, B, and C in the time domain. If the positive sequence is selected, equations (8), (9), and (10) are used for the transformation. If negative sequence is selected, then equations (16), (17), and (18) are used, and if zero sequence is selected, equations (24), (25), and (26) are used. For a given narrow band harmonic controller 32, it will be appreciated that if the transformations for an incorrect sequence (positive instead of negative, negative instead of zero, etc.) are used by the transformation module 40 and/or the inverse transformation module 50, the control system 30 will not be able to effectively reduce the harmonic targeted for reduction.

Returning to FIG. 9, once the measured phase voltages have been transformed to DQ by the transformation module 40, the DC component of the DQ variables characterizes the magnitude and phase of the targeted harmonic. In the HNFC 10, the DQ variables may include frequency components other than DC due to other harmonic frequencies present and also from the fundamental. The low pass filter 42, which is not described in the '766 patent, operates to effectively remove all frequency components other than DC.

Consider the following signal, which is a balanced three-phase signal, with a 10 Hz fundamental and two harmonic noise components, one at 100 Hz and one at 110 Hz:

$$v_a = 10 \cdot \cos(2 \cdot \pi \cdot 10 \cdot t) + \quad (27), (28), (29)$$
$$2 \cdot \cos(2 \cdot \pi \cdot 100 \cdot t + \pi/3) + \cos(2 \cdot \pi \cdot 110 \cdot t - \pi/3)$$
$$v_b = 10 \cdot \cos(2 \cdot \pi \cdot 10 \cdot t - 2 \cdot \pi/3) +$$
$$2 \cdot \cos(2 \cdot \pi \cdot 100 \cdot t + \pi/3 - 2 \cdot \pi/3) +$$
$$\cos(2 \cdot \pi \cdot 110 \cdot t - \pi/3 - 2 \cdot \pi/3)$$
$$v_c = 10 \cdot \cos(2 \cdot \pi \cdot 10 \cdot t - 2 \cdot \pi/3) +$$
$$2 \cdot \cos(2 \cdot \pi \cdot 100 \cdot t + \pi/3 - 2 \cdot \pi/3) +$$
$$\cos(2 \cdot \pi \cdot 110 \cdot t - \pi/3 - 2 \cdot \pi/3)$$

Figure 12:
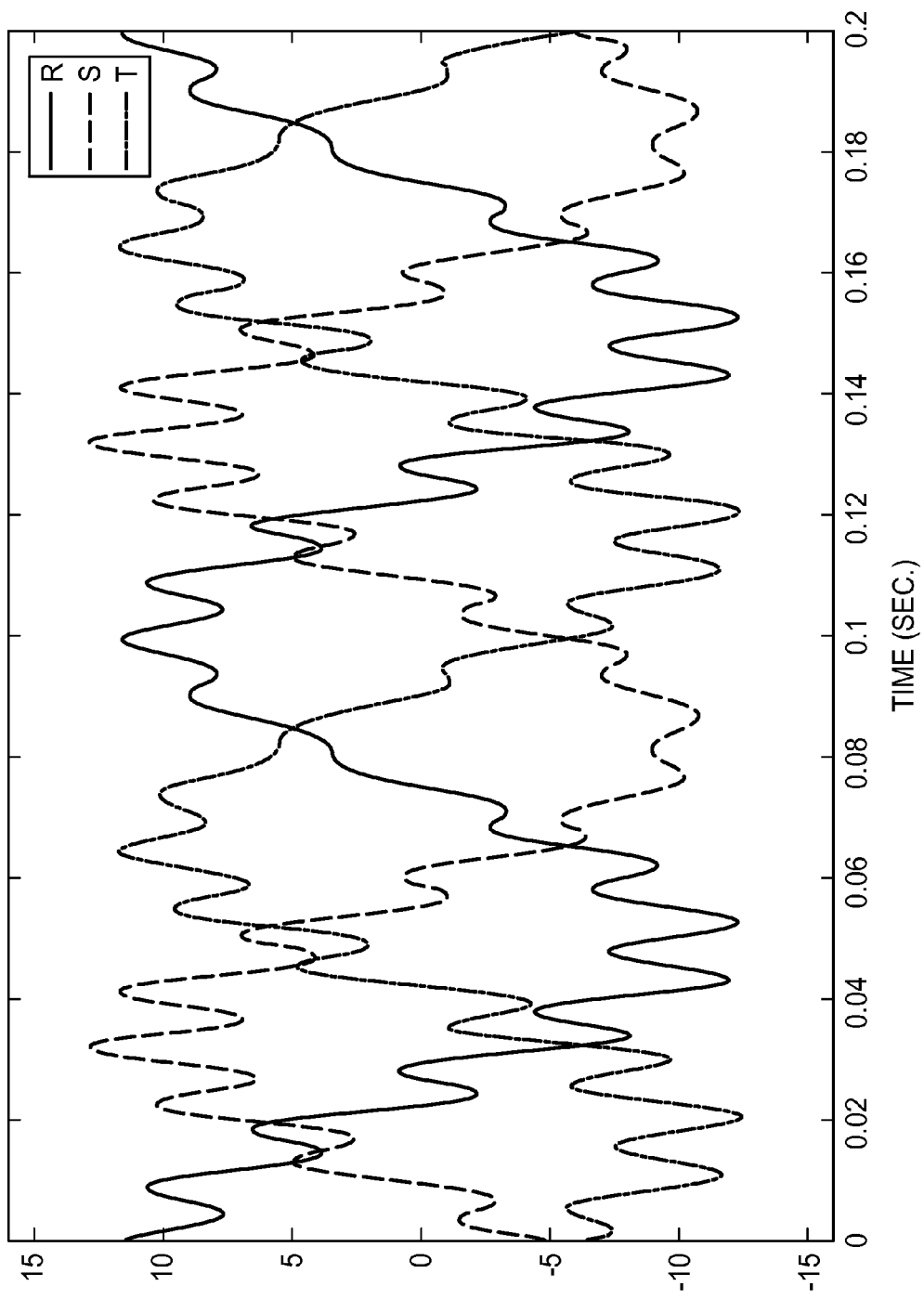
FIG. 12 is a plot of the three-phase signal in the time domain.
Figure 13:
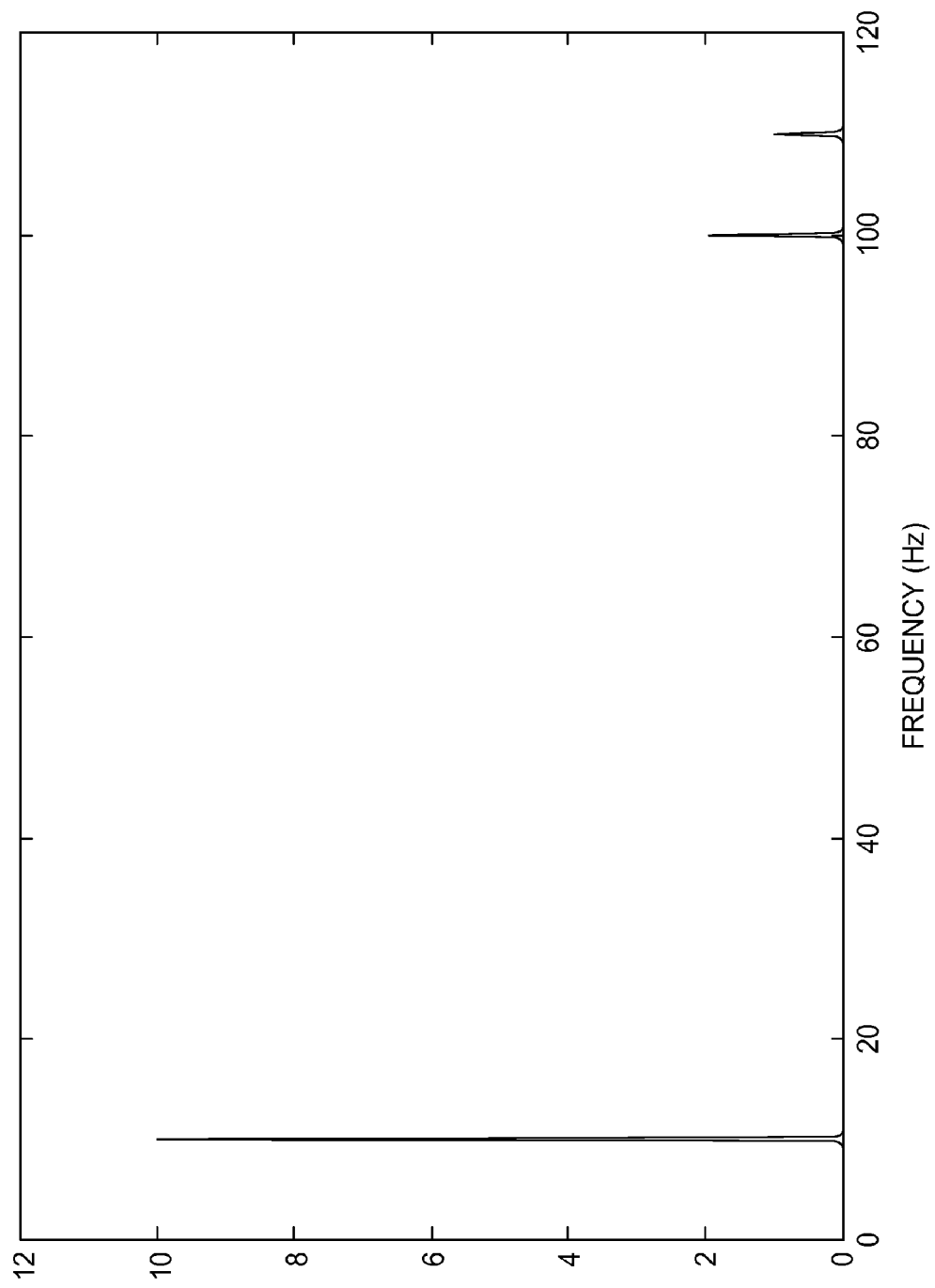
FIG. 13 is a frequency magnitude plot of Phase A of the signal of FIG. 12.

The fundamental and both harmonics are all positive sequence. A plot of the three-phase signal in the time domain is shown in FIG. 12 (where R, S and T are the "outputs" of the A. B and C phases) and a frequency magnitude plot of Phase A of the signal from a fast Fourier Transform (fft) is shown in FIG. 13.

Figure 14:
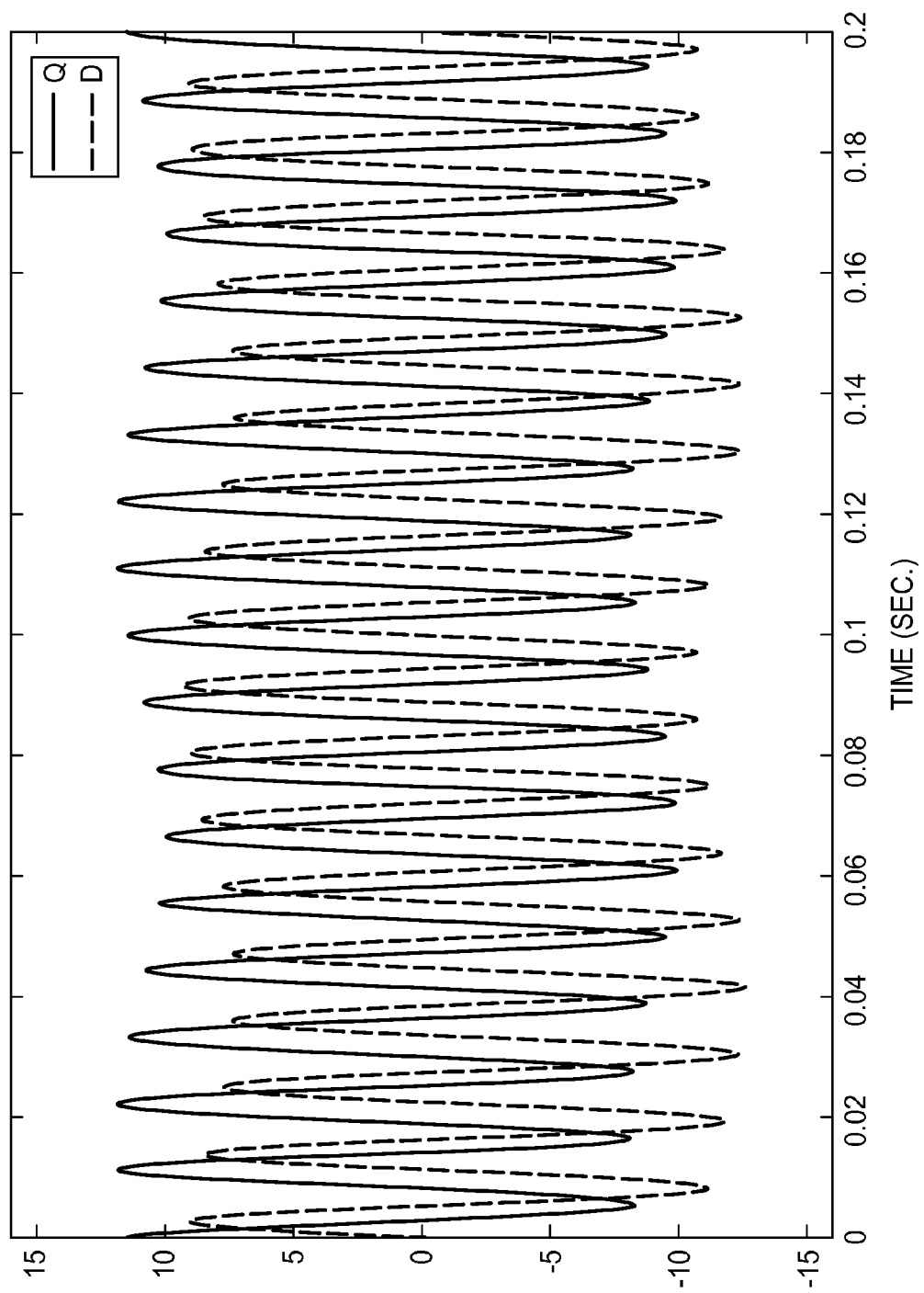
FIG. 14 illustrates the three-phase signal of FIG. 12 after a DQ transformation.

A DQ transformation is applied to the three-phase signal, as described by Equations (4) and (5) above for positive sequence signals. If the narrow band harmonic controller 32 targets the 100 Hz (harmonic number=10 for the 10 Hz fundamental), the narrow band harmonic controller 32 obtains the magnitude and phase of the 100 Hz three-phase component using the output of the DQ transformation. FIG. 14 shows the signal after the application of the DQ transformation. Ideally the D and Q signals would be constant (DC) quantities, whose collective magnitudes would indicate magnitude and phase of the targeted 100 Hz three-phase harmonic. The presence of the 110 Hz harmonic and the 10 Hz fundamental, however, result in oscillatory behavior in the DQ signal (the 110 Hz noise component produces a 10 Hz oscillation in the DQ signal, and the 10 Hz fundamental produces a 90 Hz oscillation in the DQ signal). The oscillatory behavior of the D and Q signals make it difficult for the narrow band harmonic controller 32 to identify the magnitude and phase of the targeted harmonic and to reduce that harmonic.

When the low pass filters 42 are applied to the D and Q signals, the effect is to remove the oscillatory components from the DQ output signals. This eliminates the artifacts of the 110 Hz and 10 Hz signal components, which are not targeted. For testing, the following low pass filter 42 was applied to the output of the DQ transformation:

$$H(s) = \frac{25}{s^2 + 10s + 25} \quad (30)$$

This low pass filter 42 is a two pole low pass filter with a cut-off frequency of about 0.8 Hz.

Figure 15:
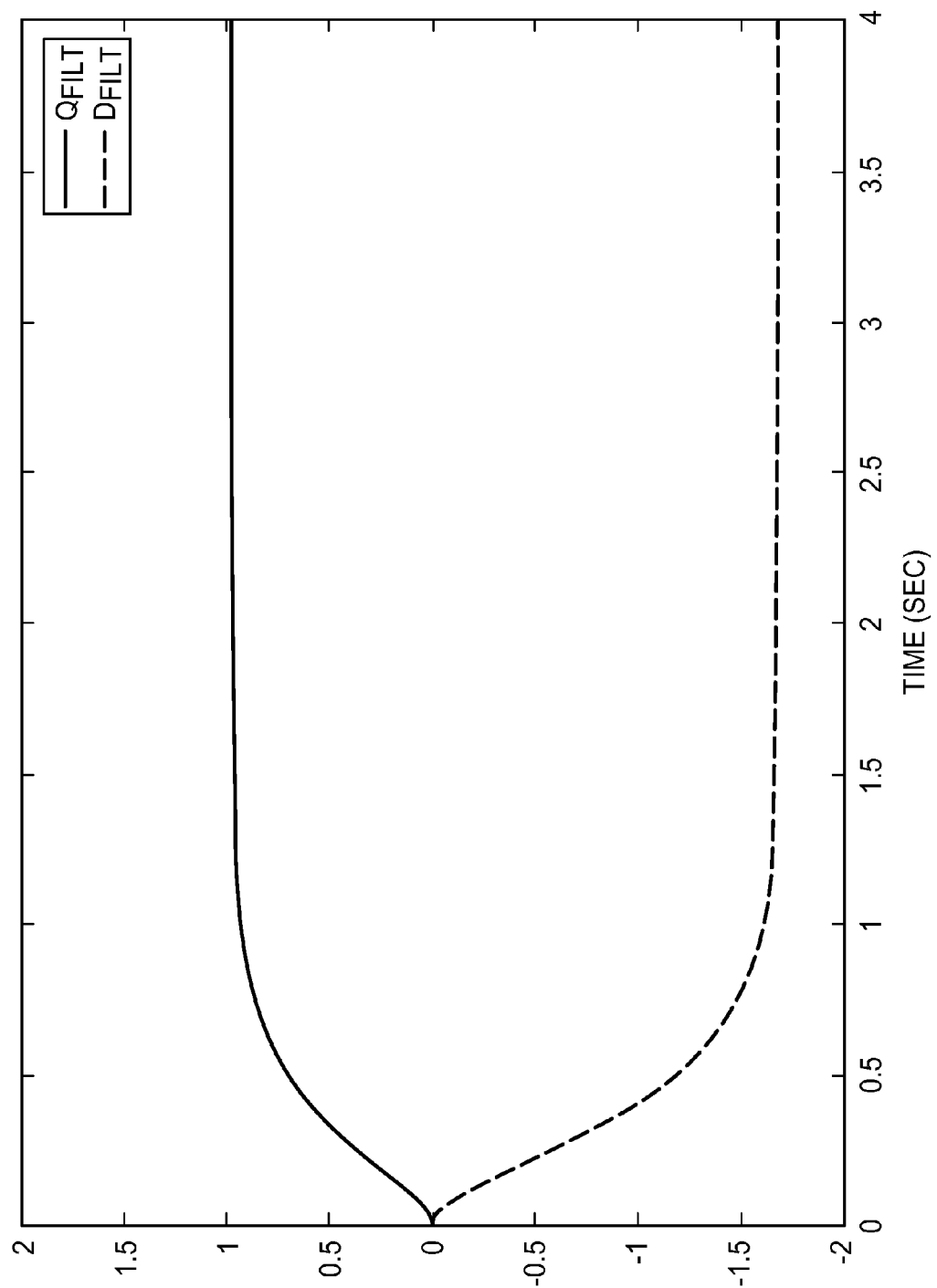
FIG. 15 illustrates D and Q representations of the three-phase signal of FIG. 12 at an output of a low pass filter of the narrow band harmonic controller of FIG. 9.

FIG. 15 shows the D and Q signals at the output of low pass filter 42. The oscillatory behavior has been significantly reduced, and the resulting D and Q signal can be used to determine the magnitude and phase of the targeted 100 Hz harmonic in the original signal.

The PID controllers 44, because of the derivative term, have the ability to move the HFNC dynamics into a more stable regime. Experiment has shown that the derivative term contributes to the improved performance of the control system 30. Ideally, each narrow band harmonic controller 32 is independent of every other narrow band harmonic controller 32, but experience has shown that this is not always the case. Ideally, the DQ transformation 40 and the corresponding low pass filters 42 eliminate the effect of every harmonic not targeted by the particular narrow band harmonic controller 32. However, this is not necessarily the case. Some effects from non-targeted harmonics can remain, and these effects can result in decreased stability of the control system 30 when the derivative term is not used. Thus, it will be appreciated that the use of the derivative term in the PID controllers 44 serves to increase the stability of the control system 30.

Returning to FIG. 9, the Zshift subsystem 48 is used to determine the output command of the neutralization inverter 14 required to produce a given magnitude and phase voltage across the primary winding of the harmonic injection transformer 16. The Zshift subsystem 48 essentially provides an appropriate phase shift to the output of the PID controllers 44 for the D and Q variables to produce the desired voltage at the output of the harmonic injection transformer 16. The output of the low pass filters 46 are D and Q quantities, which capture phase and magnitude information of the command voltage output, similar to the phase and magnitude captured by a complex variable (real and imaginary). The Zshift subsystem 48 multiplies the D and Q quantities by a complex constant, whose value is determined by the HFNC parameters (e.g., transformer leakage inductance, load inductance). The complex constant treats the two DQ components like real and imaginary components (e.g., multiplying a DQ variable by the complex variable j ($j=\sqrt{-1}$) has the effect of shifting the phase of the DQ variable by 90 degrees). The result of the Zshift operation is to produce a voltage command that, when produced by the neutralization inverter 14, will result in an appropriate voltage at the output of the PWM filter 18 on the load side of the harmonic injection transformer 16. After the phase angle of the reference voltages has been shifted to align the reference voltages to the desired voltage at the output of the harmonic injection transformer 16, the magnitudes of the reference voltages are scaled by the turns ratio (1/a) of the harmonic injection transformer 16 to match the magnitude of the desired voltage at the output of the harmonic injection transformer 16. The end result is a reference voltage at the input of the neutralization inverter 14 that will enable the neutralization inverter 14 to produce ac voltages that will have the appropriate magnitudes and phase angles at the input of the harmonic injection transformer 16 to cancel the targeted harmonic on the output side of the harmonic injection transformer 16.

Figure 16:
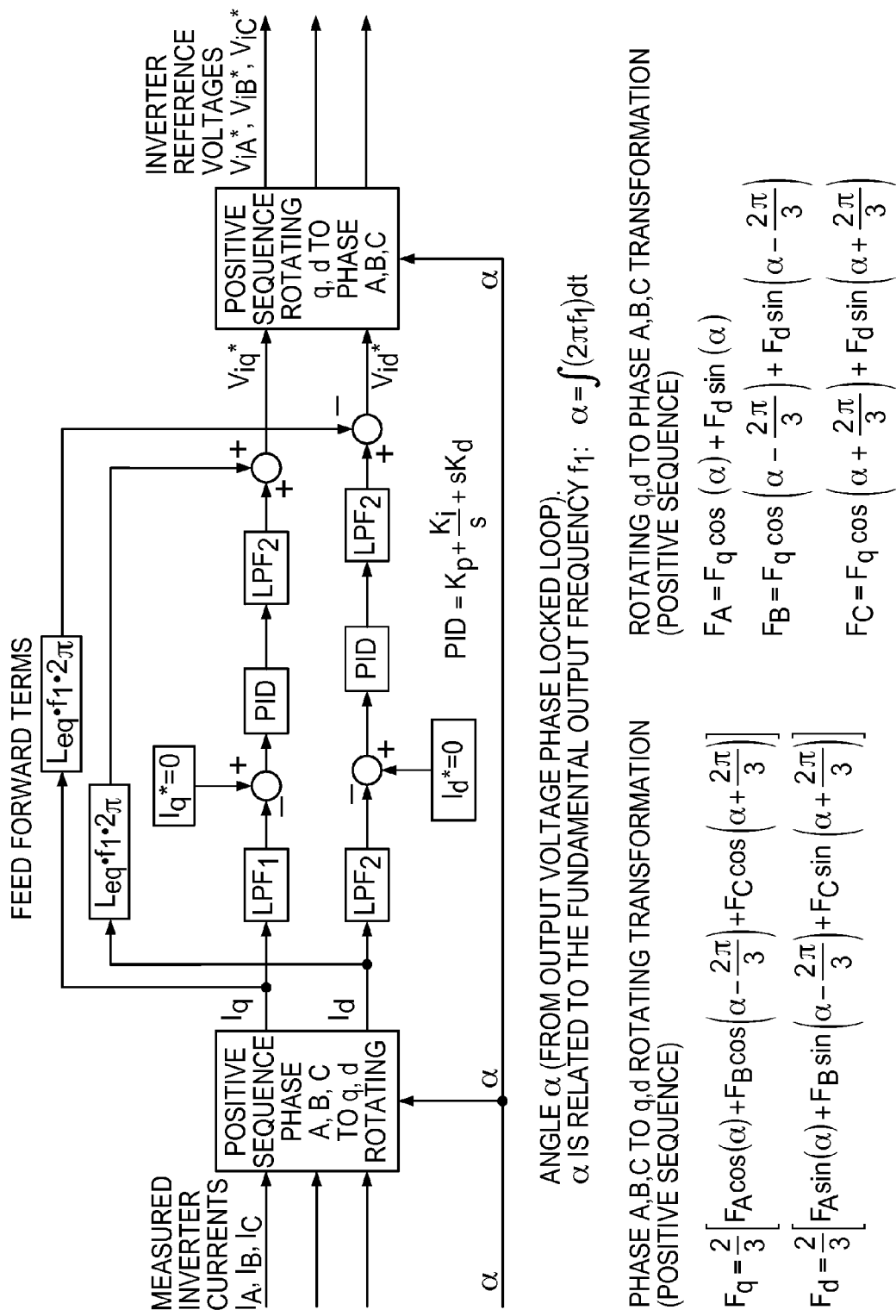
FIG. 16 illustrates various embodiments of a fundamental inverter current controller of the control system of FIG. 8.

FIG. 16 illustrates various embodiments of the fundamental inverter current controller 36. The neutralization inverter 14 currents are measured and fed back to the fundamental inverter current controller 36 as shown in FIG. 8. The currents ($I_A, I_B, I_C$) are transformed to DQ quantities using the positive sequence transformation described above with respect to the narrow band harmonic controllers 32. The low pass filter 42 and PID controller 44 are used the same way as they are used in the narrow band harmonic controllers 32. A unique feature of the fundamental inverter current controller 36 are feed forward/decoupling terms designated by $L_{eq}(2\pi f_1)$ where $f_1$ is the fundamental output frequency. The feed forward/decoupling terms decouple the D and Q axes in the fundamental inverter current controller 36 which greatly simplifies the operation of the fundamental inverter current controller 36. The derivation of the feed forward terms is described below.

Figure 17:
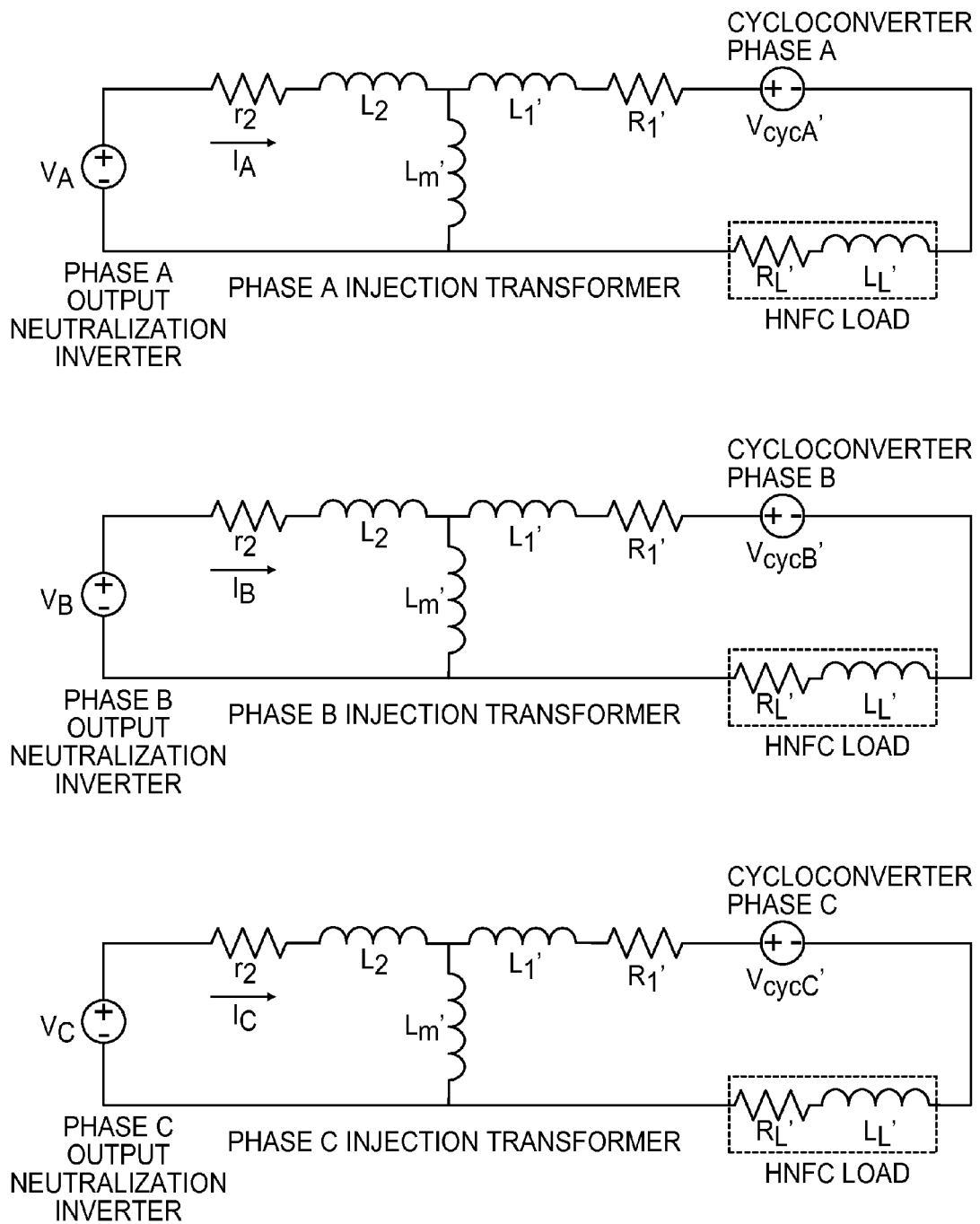
FIG. 17 illustrates a simplified representation for the three phases in the HNFC of FIG. 6.

FIG. 17 illustrates a simplified diagram for the three phases in the HNFC 10. In addition to the neutralization inverter 14 control, the inverter voltage sources $V_A$, $V_B$, and $V_C$ are also controlled by the fundamental inverter current controller 36 to reduce the fundamental component of the currents $I_A$, $I_B$, and $I_C$. The three cycloconverter voltages $V_{cyca}$, $V_{cycb}$ and $V_{cycc}$ are considered disturbances; the fundamental components of the currents, $I_{A1}$, $I_{B1}$, and $I_{C1}$, created by the cycloconverter 12 should be minimized by the fundamental inverter current controller 36. The cycloconverter voltages are assumed to be a balanced, three-phase signal at the fundamental frequency. The $r_2, L_2, r_1, L_1$ parameters are leakage parameters of the voltage injection transformers 16. The prime notation (') indicates that a quantity is referred to the secondary of each transformer. $L_m$ is the transformer magnetizing inductance. $R_L$ and $L_L$ are the Load impedances for each phase.

Figure 18:
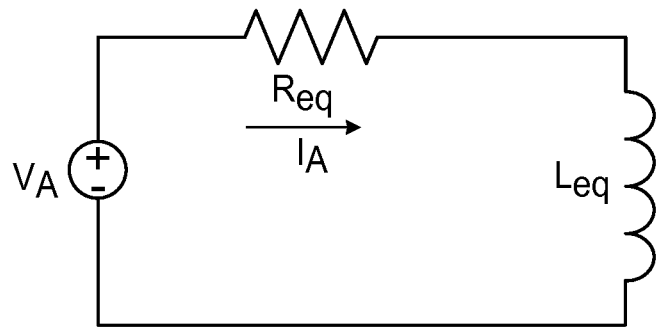
FIG. 18 illustrates a further simplified representation for the three phases in the HNFC of FIG. 6.
Figure 18:
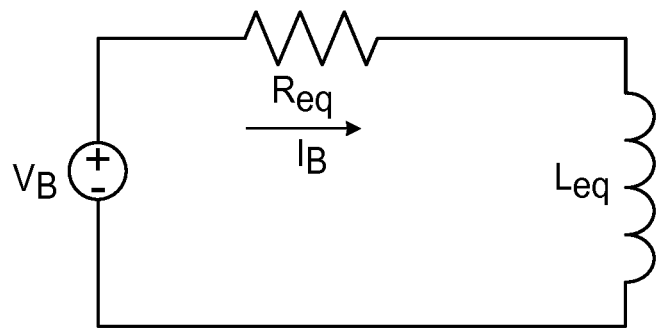
Figure 18:
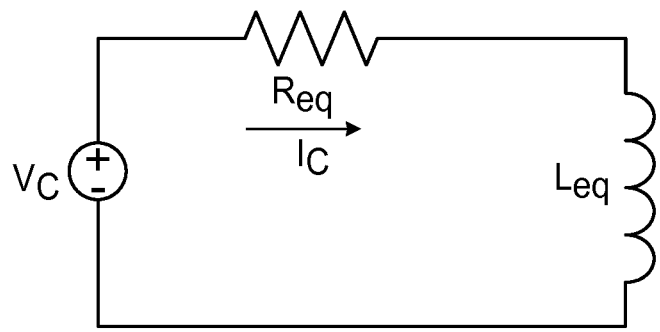

FIG. 18 illustrates a further simplified diagram for the three phases in the HNFC 10. The cycloconverter voltage has been removed (using the Superposition Principle, we treat the cycloconverter as a disturbance to the system, which is to be eliminated by the controller of the PWM inverter 14). Also, the impedances have been simplified to $R_{eq}$ and $L_{eq}$. If we let $R_P = R_1' + R_L$ and $L_P = L_1' + L_L$. Then, $$R_{eq} = r_2 + \frac{R_P L_m'(L_P + L_m') - R_P L_P L_m'}{R_P^2 + (L_p + L_m)^2} \tag{31}$$

where the numerator in equation (31) can be simplified to $R_P(L_m')^2$,
and $$L_{eq} = L_2 + \frac{R_P^2 L_m' + L_P L_m'(L_P + L_m')}{R_P^2 + (L_p + L_m)^2} \tag{32}$$

The fundamental inverter current controller 36 simultaneously controls the three phases of the simplified representation of the HFNC 10 shown in FIG. 18. The three phase variables $I_A$, $I_B$ and $I_C$ are transformed to the DQ rotating reference frame using an angle related to the fundamental frequency as shown in FIG. 16. Transforming the three phases of the simplified representation of the HFNC 10 shown in FIG. 18 to the DQ rotating reference frame and writing voltage loop equations, yields:

$$v_q = R_{eq} I_q + \omega L_{eq} I_d + L_{eq} \frac{dI_q}{dt} \tag{33}, (34)$$

$$v_d = R_{eq} I_d - \omega L_{eq} I_q + L_{eq} \frac{dI_d}{dt}$$

where $\omega = 22\pi f_1$ and $f_1$ is the fundamental frequency. Equations (33) and (34) can be rearranged and put into matrix form:

$$\begin{bmatrix} \frac{dI_q}{dt} \\ \frac{dI_d}{dt} \end{bmatrix} = \begin{bmatrix} -\frac{R_{eq}}{L_{eq}} & -\omega \\ \omega & -\frac{R_{eq}}{L_{eq}} \end{bmatrix} \begin{bmatrix} I_q \\ I_d \end{bmatrix} + \frac{1}{L_{eq}} \begin{bmatrix} v_q \\ v_d \end{bmatrix} \tag{35}, (36)$$

We can create new voltages $\hat{V}_q$ and $\hat{V}_d$ such that:

$$V_q = \hat{V}_q + L_{eq} \omega I_d \tag{37}$$

and $$V_d = \hat{V}_d - L_{eq} \omega I_q \tag{38}$$

Substituting Equations (37) and (38) into Equations (35) and (36), produces:

$$\begin{bmatrix} \frac{dI_q}{dt} \\ \frac{dI_d}{dt} \end{bmatrix} = \begin{bmatrix} -\frac{R_{eq}}{L_{eq}} & 0 \\ 0 & -\frac{R_{eq}}{L_{eq}} \end{bmatrix} \begin{bmatrix} I_q \\ I_d \end{bmatrix} + \frac{1}{L_{eq}} \begin{bmatrix} \hat{v}_q \\ \hat{v}_d \end{bmatrix} \quad (39), (40)$$

Equations (39) and (40) allow us to treat the system in the DQ reference frame as two, independent single-input, single output (SISO) systems, if we use $V_q = \hat{V}_q + L_{eq}\omega I_d$ and $V_d = \hat{V}_d - L_{eq}\omega I_q$ where $\hat{V}_q$ and $\hat{V}_d$ are the inputs to the two independent SISO systems. Using this idea, the transfer function for each of the two SISO systems becomes:

$$P(s) = \frac{I(s)}{V(s)} = \frac{\frac{1}{R_{eq}}}{\frac{L_{eq}}{R_{eq}}s + 1} \quad (41)$$

Figure 19:
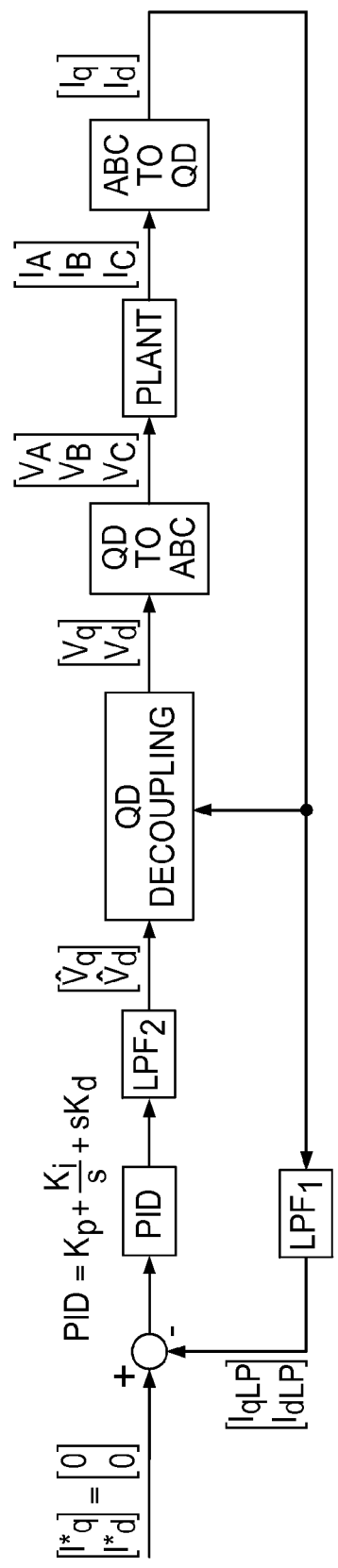
FIG. 19 illustrates various embodiments of the fundamental inverter current controller of FIG. 16.

FIG. 19 illustrates various embodiments of a matrix oriented block diagram of the fundamental inverter current controller 36. Low pass filters designated as $LPF_1$ are used on the Q and D outputs of the DQ conversion block to filter out behaviors that correspond to frequencies other than the fundamental frequency. The DQ Decoupling block implements the procedure described above, which causes the "plant" to behave as two independent SISO systems.

Figure 20:
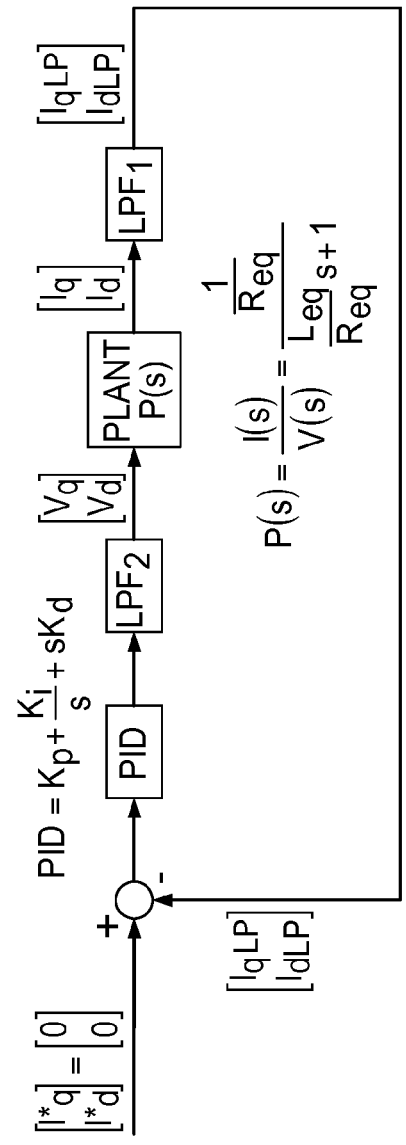
FIG. 20 illustrates a simplified block version of the fundamental inverter controller of FIG. 19.

FIG. 20 illustrates various embodiments of a simplified block version of FIG. 19 and shows how the decoupling term simplifies the fundamental inverter current controller 36. The simplified diagram from FIG. 20 captures the dynamics that affect the PID controller in the fundamental inverter current controller 36.

The components of the control system 30 may be implemented in any suitable manner. For example, according to various embodiments, the various components may be implemented as one or more modules in hardware, firmware, software and combinations thereof. According to various embodiments, the components may be implemented by a computing system having one or more processors, and each of the modules are communicably connected to the one or more processors.

For embodiments utilizing software, the software may utilize any suitable computer language (e.g., C, C++, Java, JavaScript, Visual Basic, VBScript, Delphi) and may be embodied permanently or temporarily in any type of machine, component, physical or virtual equipment, storage medium, or propagated signal capable of delivering instructions to a device. The functionalities of the various components of the control system 30 may be stored on a computer-readable medium (e.g., disk, device, and/or propagated signal) such that when a computer reads the medium, the functions described herein are performed. According to various embodiments, the functionality of the control system 30 may be combined into fewer modules, distributed differently amongst the modules, spread over additional modules, etc. For embodiments where the computing system includes more than one computing device, the functionality of the control system 30 may be distributed amongst a plurality of the computing devices.

Figure 21:
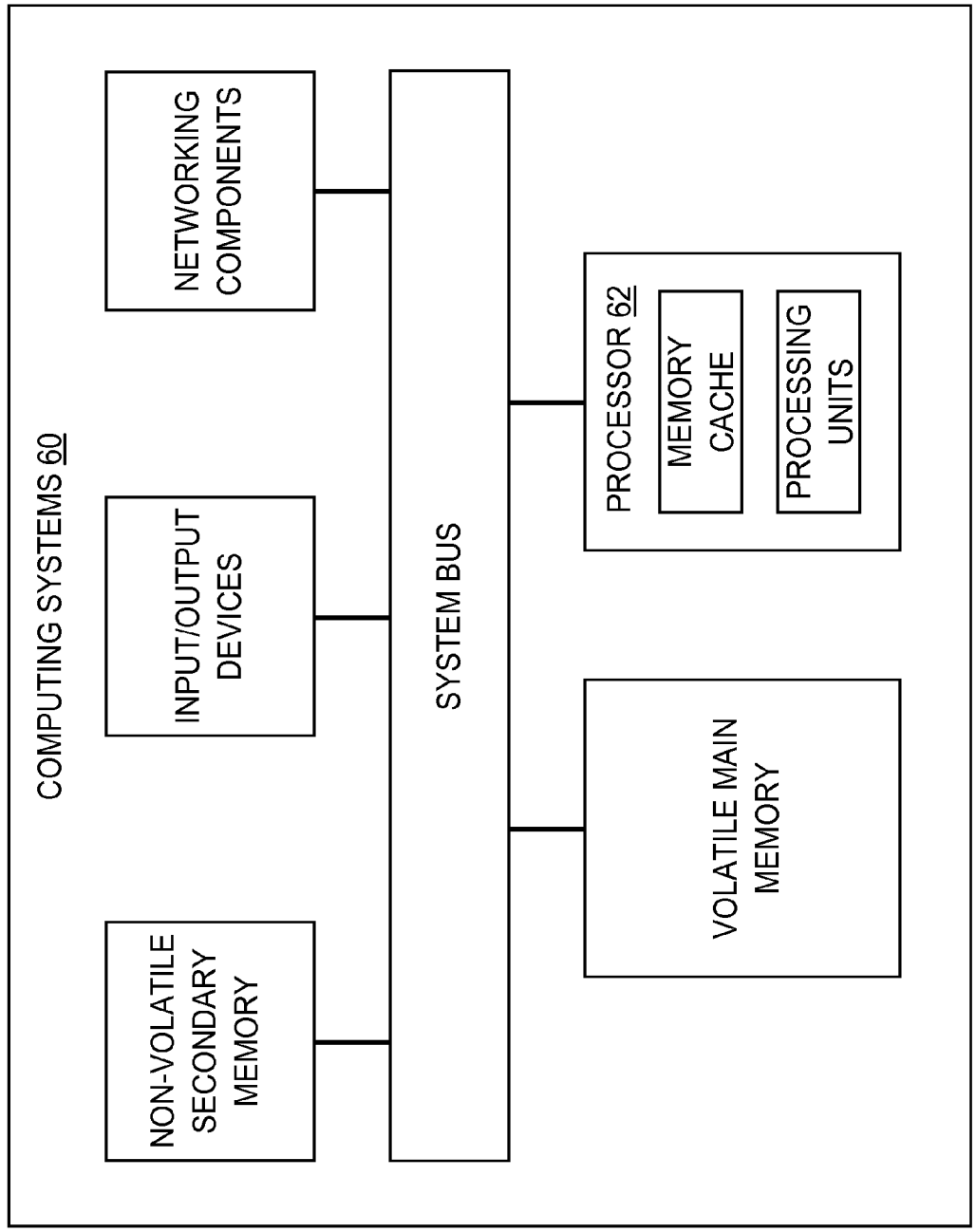
FIG. 21 illustrates a computing system which implements the functionality of the control system of FIG. 8 according to various embodiments.

FIG. 21 illustrates a computing system 60 which implements the functionality of the control system 30 according to various embodiments. The computing system 60 may be embodied as one or more computing devices, and includes networking components such as Ethernet adapters, non-volatile secondary memory such as magnetic disks, input/output devices such as keyboards and visual displays, volatile main memory, and a processor 62. Each of these components may be communicably connected via a common system bus. The processor 62 includes processing units and on-chip storage devices such as memory caches.

According to various embodiments, the computing system 60 includes one or more modules which are implemented in software, and the software is stored in non-volatile memory devices while not in use. When the software is needed, the software is loaded into volatile main memory. After the software is loaded into volatile main memory, the processor 62 reads software instructions from volatile main memory and performs useful operations by executing sequences of the software instructions on data which is read into the processor 62 from volatile main memory. Upon completion of the useful operations, the processor 62 writes certain data results to volatile main memory.

Nothing in the above description is meant to limit the invention to any specific materials, geometry, or orientation of elements. Many part/orientation substitutions are contemplated within the scope of the invention and will be apparent to those skilled in the art. The embodiments described herein were presented by way of example only and should not be used to limit the scope of the invention.

Although the invention has been described in terms of particular embodiments in this application, one of ordinary skill in the art, in light of the teachings herein, can generate additional embodiments and modifications without departing from the spirit of, or exceeding the scope of, the described invention. Accordingly, it is understood that the drawings and the descriptions herein are proffered only to facilitate comprehension of the invention and should not be construed to limit the scope thereof.

What is claimed is:

1. A control system for a harmonic neutralized frequency changer, the control system comprising:
   a processor;
   a narrow band harmonic controller communicably connected to the processor, wherein the narrow band harmonic controller is configured to reduce the following components for a harmonic generated by a cycloconverter of the harmonic neutralized frequency changer:
     a positive sequence component;
     a negative sequence component; and
     a zero sequence component; and
   a fundamental current controller communicably connected to the processor, wherein the fundamental current controller is configured to reduce a fundamental frequency component of current flowing in a neutralization inverter of the harmonic neutralized frequency changer.

2. The control system of claim 1, wherein the narrow band harmonic controller comprises:
   a transformation module communicably connected to the processor, wherein the transformation module is configured for transforming first phase variables to first direct and quadrature variables;
   a Zshift subsystem communicably connected to the processor, wherein the Zshift subsystem is configured to shift a phase angle of second direct and quadrature variables; and
   an inverse transformation module communicably connected to the processor, wherein the inverse transformation module is configured for transforming third direct and quadrature variables to second phase variables.

3. The control system of claim 2, wherein the Zshift subsystem is further configured to scale magnitudes of the second direct and quadrature variables.

4. The control system of claim 1, wherein the narrow band harmonic controller further comprises a low pass filter communicably connected to the processor.

5. The control system of claim 1, wherein the narrow band harmonic controller further comprises a proportional-integral-derivative controller communicably connected to the processor.

6. The control system of claim 1, wherein the fundamental inverter current controller comprises:
   a transformation module communicably connected to the processor, wherein the transformation module is configured for transforming first phase variables to first direct and quadrature variables;
   a decoupling module communicably connected to the processor, wherein the decoupling module is configured to decouple the first direct variable and the first quadrature variable:
   an inverse transformation module communicably connected to the processor, wherein the inverse transformation module is configured for transforming second direct and quadrature variables to second phase variables.

7. The control system of claim 1, wherein the fundamental inverter current controller further comprises a low pass filter communicably connected to the processor.

8. The control system of claim 1, wherein the fundamental inverter current controller further comprises a proportional-integral-derivative controller communicably connected to the processor.

9. A harmonic neutralized frequency changer, comprising:
   a cycloconverter;
   a first neutralization inverter coupled to an input side of the cycloconverter;
   a second neutralization inverter coupled to an output side of the cycloconverter;
   a harmonic injection transformer coupled to the cycloconverter and the second neutralization inverter; and
   a control system coupled to the second neutralization inverter, wherein the control system comprises:
      a processor;
      a narrow band harmonic controller communicably connected to the processor, wherein the narrow band harmonic controller is configured to reduce the following components for a harmonic generated by a cycloconverter of the harmonic neutralized frequency changer:
         a positive sequence component;
         a negative sequence component; and
         a zero sequence component; and
      a fundamental current controller communicably connected to the processor, wherein the fundamental current controller is configured to reduce a fundamental frequency component of current flowing in a neutralization inverter of the harmonic neutralized frequency changer.

10. The harmonic neutralized frequency changer of claim 9, wherein the narrow band harmonic controller comprises:
   a transformation module communicably connected to the processor, wherein the transformation module is configured for transforming first phase variables to first direct and quadrature variables;
   a Zshift subsystem communicably connected to the processor, wherein the Zshift subsystem is configured to shift a phase angle of second direct and quadrature variables; and
   an inverse transformation module communicably connected to the processor, wherein the inverse transformation module is configured for transforming third direct and quadrature variables to second phase variables.

11. The harmonic neutralized frequency changer of claim 10, wherein the Zshift subsystem is further configured to scale magnitudes of the second direct and quadrature variables.

12. The harmonic neutralized frequency changer of claim 9, wherein the narrow band harmonic controller further comprises a low pass filter communicably connected to the processor.

13. The harmonic neutralized frequency changer of claim 9, wherein the narrow band harmonic controller further comprises a proportional-integral-derivative controller communicably connected to the processor.

14. The harmonic neutralized frequency changer of claim 9, wherein the fundamental inverter current controller comprises:
   a transformation module communicably connected to the processor, wherein the transformation module is configured for transforming first phase variables to first direct and quadrature variables;
   a decoupling module communicably connected to the processor, wherein the decoupling module is configured to decouple the first direct variable and the first quadrature variable;
   an inverse transformation module communicably connected to the processor, wherein the inverse transformation module is configured for transforming second direct and quadrature variables to second phase variables.

15. The harmonic neutralized frequency changer of claim 9, wherein the fundamental inverter current controller further comprises a low pass filter communicably connected to the processor.

16. The harmonic neutralized frequency changer of claim 9, wherein the fundamental inverter current controller further comprises a proportional-integral-derivative controller communicably connected to the processor.

17. The harmonic neutralized frequency changer of claim 9, further comprising a low pass filter coupled to a load side of the harmonic injection transformer.

18. The harmonic neutralized frequency changer of claim 9, further comprising a common-mode blocking inductor coupled to the second neutralization inverter.

19. The harmonic neutralized frequency changer of claim 9, further comprising a fundamental power factor correction inverter coupled to an input side of the cycloconverter.

20. The harmonic neutralized frequency changer of claim 9, further comprising a passive filter coupled to an input side of the cycloconverter.

* * * * *